US009279908B2

(12) United States Patent
Nagahara et al.

(10) Patent No.: US 9,279,908 B2
(45) Date of Patent: Mar. 8, 2016

(54) INK FOR ELECTROWETTING DEVICE AND ELECTROWETTING DEVICE USING THE SAME

(71) Applicant: Sekisui Chemical Co., Ltd., Osaka (JP)

(72) Inventors: Yu Nagahara, Ibaraki (JP); Takeshi Wakiya, Ibaraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/364,423

(22) PCT Filed: Jan. 25, 2013

(86) PCT No.: PCT/JP2013/051638
§ 371 (c)(1),
(2) Date: Jun. 11, 2014

(87) PCT Pub. No.: WO2013/111873
PCT Pub. Date: Aug. 1, 2013

(65) Prior Publication Data
US 2014/0347716 A1 Nov. 27, 2014

(30) Foreign Application Priority Data

Jan. 25, 2012 (JP) ................................. 2012-013253
Mar. 19, 2012 (JP) ................................. 2012-062579

(51) Int. Cl.
G02B 26/00 (2006.01)
G02B 1/06 (2006.01)
C09D 11/037 (2014.01)
C09D 11/106 (2014.01)

(52) U.S. Cl.
CPC ................ *G02B 1/06* (2013.01); *C09D 11/037* (2013.01); *C09D 11/106* (2013.01); *G02B 26/005* (2013.01)

(58) Field of Classification Search
CPC ...................................................... G02B 26/005
See application file for complete search history.

(56) References Cited

U.S. PATENT DOCUMENTS

2002/0097198 A1* 7/2002 Matsuura et al. ................ 345/30
2013/0313491 A1* 11/2013 Vilner et al. ............. 252/519.21

FOREIGN PATENT DOCUMENTS

| CN | 102272671 | 12/2011 |
| EP | 2071385 | 6/2009 |
| JP | 2007-531917 | 11/2007 |
| JP | 2008-203282 | 9/2008 |
| JP | 2009-199013 | 9/2009 |
| JP | 2010-276716 | 12/2010 |
| JP | 2011-53706 | 3/2011 |
| WO | 2005/098524 | 10/2005 |
| WO | 2010/077239 | 7/2010 |

OTHER PUBLICATIONS

International Search Report issued Feb. 19, 2013 in International (PCT) Application No. PCT/JP2013/051638.
Office Action issued on Oct. 29, 2015, in corresponding Chinese Application No. 201380003914.7 (with partial translation).

* cited by examiner

*Primary Examiner* — James Jones
(74) *Attorney, Agent, or Firm* — Wenderoth, Lind & Ponack, L.L.P.

(57) ABSTRACT

The present invention relates to an ink for an electrowetting element comprising colorant particles and a solvent, wherein the colorant particles have a specific gravity of 2 or less and an average particle diameter of 20 to 300 nm, and wherein the content of the colorant particles in the ink is 5 to 50% by mass.

8 Claims, 2 Drawing Sheets

INK FOR ELECTROWETTING DEVICE AND ELECTROWETTING DEVICE USING THE SAME

TECHNICAL FIELD

1. Technical Field

The present invention relates to an ink for an electrowetting element (EW element) which can be advantageously used for displays such as an electrowetting display, and also relates to an electrowetting device using the ink. Priorities are claimed on Japanese Patent Application No. 2012-013253, filed Jan. 25, 2012, and Japanese Patent Application No. 2012-062579, filed Mar. 19, 2012, the contents of which are incorporated herein by reference.

2. Background Art

In recent years, electrowetting elements (EW elements) using electrowetting effect have been attracting attention. In general, an EW element has a pair of opposing substrates having a space therebetween filled with two types of liquids that are mutually immiscible due to difference in surface energy between the liquids, in which one of the substrates has on its surface an electrode layer and a hydrophobic intermediate layer (insulating layer) formed on the electrode layer. The two types of liquids used are a high surface energy (conductive) liquid which has a relatively high surface energy and is hydrophilic and a low surface energy (insulating) liquid which has a relatively low surface energy and is hydrophobic.

With respect to such an EW element, when a voltage is applied between the high surface energy liquid and the electrode layer which are separated through the insulating layer, the high surface energy liquid is drawn toward the hydrophobic intermediate layer (insulating layer), which causes the change in interface morphology between the high surface energy liquid and the low surface energy liquid. The EW element utilizes such a voltage-induced change in interface morphology between the two liquids and is known to be used in electrowetting devices applied in various fields such as a transmissive or reflective electrowetting display (EWD), an optical lens, and a shutter for an imaging device such as a camera.

When an EW element is used for an EWD, for example, a light transmissive liquid is used as the high surface energy liquid and a colorant ink having a hiding power (light shielding property) is used as the low surface energy liquid. In such an EWD, the application of voltage causes the change in interface morphology between the light transmissive liquid and the colorant ink having a hiding power, whereby the transmission and shielding of light can be switched in the case where the EWD is of a transmissive type. On the other hand, when the EWD is of a reflective type, the shielding and reflection of light can be switched. Therefore, it is desired that an ink having a high hiding power is used for an EW element. The ink having a hiding power which is generally used for this purpose is one comprising a solvent and a dye (see, for example, Patent Document 1).

DOCUMENTS OF RELATED ART

Patent Document

[Patent Document 1] Japanese Unexamined Patent Publication (Tokuhyo) No. 2007-531917

DISCLOSURE OF INVENTION

Problems to be Solved by the Invention

However, in an ink containing a dye as a coloring component, the dye is dissolved in a molecular level so that the ink is defective in that the weatherability and the hiding power are both low. It is conceivable to solve this problem by using an ink having dispersed therein, as a coloring component, a pigment having a high weatherability and a high hiding power. However, due to its poor dispersion stability, the use of a pigment has a problem that the pigment particles aggregate in an ink and settle in an ink under the influence of gravity, so that disadvantages such as non-uniform image and lowering of contrast are likely to occur.

The present invention has been made in view of the abovementioned circumstances, and the object of the present invention is to provide an ink for an EW element which contains a pigment and exhibits an excellent hiding power (light shielding property) as well as an excellent dispersion stability of pigment particles, and an electrowetting device using the same.

Means to Solve the Problems

The present invention relates to the following aspects.

[1] An ink for an electrowetting element comprising colorant particles and a solvent,
  wherein the colorant particles have a specific gravity of 2 or less and an average particle diameter of 20 to 300 nm, and
  wherein the content of the colorant particles in the ink is 5 to 50% by mass.

[2] The ink for an electrowetting element according to [1], wherein the average particle diameter of the colorant particles is 60 to 120 nm.

[3] The ink for an electrowetting element according to [1] or [2], wherein the solvent is hydrophobic.

[4] The ink for an electrowetting element according to any one of [1] to [3], wherein the solubility parameter of the solvent is 9 or less.

[5] The ink for an electrowetting element according to any one of [1] to [4], wherein the solvent is at least one solvent selected from the group consisting of octane, nonane, decane, undecane, dodecane, toluene and xylene.

[6] The ink for an electrowetting element according to any one of [1] to [5], wherein the colorant particles have hydrophobized surfaces.

[7] The ink for an electrowetting element according to [6], wherein the hydrophobization of the surfaces of the colorant particles is performed by a method comprising introducing a hydrophobic area to at least a part of the surfaces of the colorant particles by polymer adsorption or graft polymerization.

[8] The ink for an electrowetting element according to any one of [1] to [7], wherein the colorant particles comprise a π-conjugated compound.

[9] The ink for an electrowetting element according to [8], wherein the colorant particles comprise, on the surfaces thereof, a π-conjugated compound.

[10] The ink for an electrowetting element according to [8] or [9], wherein the colorant particles comprise, on the surfaces thereof, the π-conjugated compound as a main component.

[11] The ink for an electrowetting element according to [8] to [10], wherein the π-conjugated compound is at least one member selected from the group consisting of a polyacetylene, a polyaniline, a polyfuran, a polypyrrole and a polythiophene.

[12] The ink for an electrowetting element according to [8] to [10], wherein the π-conjugated compound is at least one member selected from the group consisting of carbon black and carbon nanotube.

[13] The ink for an electrowetting element according to any one of [1] to [12], wherein the colorant particles are black particles.
[14] The ink for an electrowetting element according to any one of [1] to [13], wherein the colorant particles have a core-shell structure.
[15] The ink for an electrowetting element according to any one of [1] to [14], wherein the difference in specific gravity between the colorant particles and the solvent is 1.0 or less.
[16] An electrowetting device using the ink for an electrowetting device according to any one of [1] to [15].
[17] An electrowetting device comprising a high energy liquid as a first liquid material and a low energy liquid as a second liquid material which are immiscible with each other, the second liquid material being the ink for an electrowetting element according to any one of [1] to [16], wherein the first liquid material and the second liquid material are accommodated in a cell formed between a first substrate and a second substrate which are positioned opposite to each other.
[18] The electrowetting device according to [17], wherein the solubility parameter of the high energy liquid is 14 or more, and the solubility parameter of the low energy liquid is 9 or less.

EFFECTS OF THE INVENTION

According to the present invention, it is possible to provide an ink for an EW element which contains a pigment and exhibits an excellent hiding power (light shielding property) as well as an excellent dispersion stability of pigment particles.

According to the present invention, it is also possible to provide an ink for an EW element which contains colorant particles (especially black particles) exhibiting an excellent dispersion stability in the ink for an EW element.

According to the present invention, it is also possible to provide an electrowetting device, especially an electrowetting display (EWD), which can suppress disadvantages such as non-uniform image and lowering of contrast.

BEST MODE FOR CARRYING OUT THE INVENTION

Hereinbelow, the ink of the present invention for an EW element is described in detail taking, as an example, an EWD as an electrowetting device which is provided with EW elements.

Figure 1:
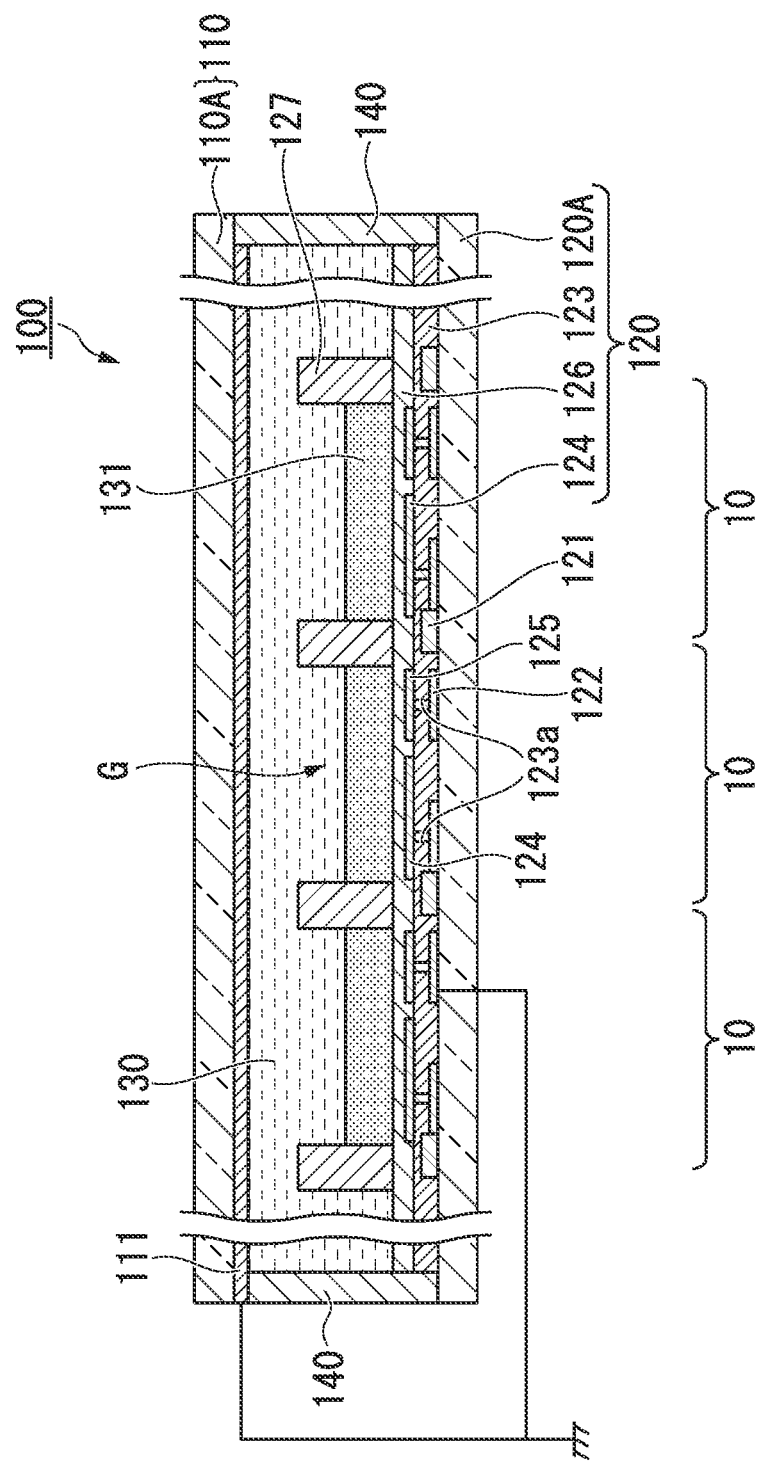
FIG. 1 is a cross-sectional view of one embodiment of the EWD having a plurality of EW elements.
Figure 2:
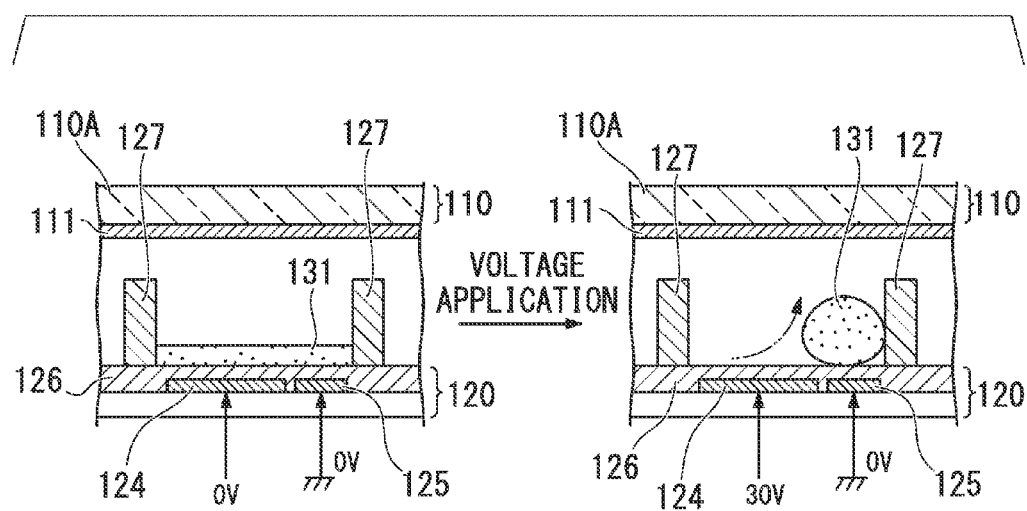
FIG. 2 is a cross-sectional view explaining the concept of how the EWD of FIG. 1 works.

FIG. 1 is a cross-sectional view of one embodiment of the EWD having a plurality of EW elements, while FIG. 2 is a cross-sectional view explaining the concept of how the EWD works. In FIG. 2, the construction of the device is simplified while omitting the parts requiring no explanation.

The EWD 100 shown in FIG. 1 has a first substrate 110 and a second substrate 120, which are positioned opposite to each other through a high surface energy liquid 130. The high surface energy liquid 130 is contained in a section (cell) formed by partitioning with a sealing material 140 provided at the outer peripheries of the substrate 110 and the substrate 120.

The above-mentioned high surface energy liquid 130 is a liquid which is in a state where the surface energy of the liquid is relatively high as compared to the surface energy of the low surface energy liquid 131 explained below.

The first substrate 110 has a substrate 110A and a common electrode 111. The second substrate 120 has a substrate 120A, a TFT 121, a wiring portion 122, a flattened membrane 123, a pixel electrode 124, a common electrode 125 and an insulating membrane 126.

The first substrate 110 is composed mainly of the substrate 110A which may be any of the substrates selected from various panel substrates generally for displays, such as a glass sheet, a resin molded article and a film. Regarding the material for the common electrode 111, it is preferred that the electrode 111 is a transparent electrode, such as an ITO (tin-doped indium oxide) electrode.

The substrate 120A in the second substrate 120 may be any of the substrates selected from various panel substrates generally for displays, such as a glass sheet, a resin molded article and a film.

In the second substrate 120, the surface of the insulating membrane 126 constituting the inner surface of the cell is treated to have water repellency by any of known methods such as a fluororesin coating and a heat treatment.

On the insulating membrane 126 is formed a pixel wall 127. The pixel wall 127 is formed to have a lattice structure and forms a plurality of pixels G sectioned on the second substrate 120. Each one of the pixels G corresponds to one EW element 10.

The pixel electrode 124 and the common electrode 125 are formed on the flattened membrane 123, and connected to the TFT 121 and the wiring portion 122 through a contact hole 123a. In each of the pixels G is placed a pair of the pixel electrode 124 and the common electrode 125. The areas sectioned by the pixel wall 127 contain the low surface energy liquid 131. The pixel wall 127 has a surface having a good affinity with the high surface energy liquid 130.

As materials for the pixel electrode 124 and the common electrode 125, ITO, Al and the like can be used. When ITO is used as an electrode material, the electrowetting display 100 to be produced is the so-called "transmissive type display" that has a light source (not shown) provided on a back side of the second substrate 120. On the other hand, when Al is used as an electrode material, the electrowetting display 100 to be produced is the so-called "reflective type electrowetting display" that, at the electrode surface thereof, reflects light received from outside.

With respect to the EWD 100 as mentioned above, when a predetermined voltage (e.g., 30 V) is applied to the pixel electrode 124 as shown in FIG. 2, a capacitor is formed where the pixel electrode 124 and the high surface energy liquid 130 serve as electrodes, and the insulating membrane 126 serves as a dielectric body. Then, the insulating membrane 126 is polarized to attract toward itself the high surface energy groups present in the high surface energy liquid 130 via electrostatic action. As a result, the low surface energy liquid 131 above the pixel electrode 124 is pushed toward the common electrode 125 whereby the liquid changes its morphology.

Thus, the application of voltage enables to selectively move the low surface energy liquid 131 in the pixel G to a position above the common electrode 125. Therefore, by the application and removal of voltage, the switching between the transmission (with voltage applied) and the shielding (without voltage) of light through each pixel G can be effected in the case where the EWD 100 is, for example, of a transmissive type, whereas the switching between the shielding (without voltage) and the reflection (with voltage applied) of light can be effected in the case where the EWD 100 is, for example, of a reflective type.

The ink of the present invention for an EW element can be advantageously used, for example, as the low surface energy liquid 131 in the EWD 100 as exemplified in FIG. 1 which is provided with the EW elements 10, and the ink comprises colorant particles and a solvent. As in this instance, the ink of the present invention for an EW element is suitable for use in displays where the ink is used without vaporizing off the solvent, i.e., used in in a liquid state containing the pigment together with the solvent.

In this specification, the average particle diameter means a diameter at cumulative 50% in the particle diameter distribution measured by a dynamic light scattering particle diameter distribution analyzer.

With respect to the shape of the colorant particles, the particles are preferably spherical because spherical colorant particles scatter light isotropically and the resultant ink for an EW element provides uniform color appearance. Specifically, it is preferred that the colorant particles are spherical particles having an aspect ratio (ratio of the major axis to the minor axis) of 1.5 or less.

The content of the colorant particles in the ink of the present invention for an EW element is preferably 5 to 50% by mass, more preferably 10 to 45 by mass. When the content is less than 5% by mass, a sufficient hiding power cannot be obtained. When the content exceeds 50% by mass, the dispersion stability of the colorant particles in the solvent is lowered.

It is preferred that the colorant particles used in the ink of the present invention comprise a π-conjugated compound. It is more preferred that the colorant particles comprise, on the surfaces thereof, a π-conjugated compound, and it is still more preferred that the colorant particles comprise, on the surfaces thereof, a π-conjugated compound as a main component.

When, for example, the colorant particles comprise, on the surfaces thereof, the π-conjugated compound as a main component, the colorant particles produce a black color and, hence, can be appropriately used as a black pigment.

The above-mentioned "main component" means a component used in an amount of 70% by mass or more based on the total weight of the ink. As examples of components other than the main component (the π-conjugated compound), there can be mentioned black inorganic materials such as titanium black and iron oxide. For example, the colorant particles used in the ink of the present invention may comprise, on the surfaces thereof, 30% by mass or less of any of the above-mentioned black inorganic materials in addition to the π-conjugated compound. In this case, the incorporation of any of the black inorganic materials can be effected by the copresence of the black inorganic particles in processes such as the preparation of carbon black or the preparation of a π-conjugated polymer by polymerization or condensation polymerization.

Further, the composition constituting the ink of the present invention may comprise a polymer of a compound other than the π-conjugated compound in addition to the π-conjugated compound as a main component insofar as the black color produced by the black particles is not affected.

The π-conjugated compounds used in the present invention include π-conjugated polymers and π-conjugated compounds containing only carbon atoms in skeleton thereof.

When the colorant particles used in the ink of the present invention comprise, on the surfaces thereof, the π-conjugated compound as a main component, specifically, the colorant particles on the whole are formed of a composition composed mainly of a π-conjugated compound. Therefore, the colorant particles may have a monolayer structure extending through to the surfaces thereof, which is formed of a composition composed mainly of a π-conjugated compound. Alternatively, the colorant particles may have a composite structure (core-shell structure) formed of an outer layer (shell) of a certain thickness including the surface of each particle and an inner layer (core) positioned inside of the outer layer. In this instance, as the shell of each particle is formed of a composition composed mainly of a π-conjugated compound, so is the surface of each particle. Therefore, in the case of the colorant particles having a monolayer structure, the formation of the surfaces thereof is performed during the production of the colorant particles, whereas in the case of the colorant particles having a composite structure (core-shell structure), the formation of the surfaces is performed at the time of formation of the shells.

The colorant particles contained in the ink of the present invention for an EW element may further comprise a thin layer formed of a dispersion stabilizer etc. used for producing the colorant particles, wherein the thin layer is formed over the surface formed of a composition composed mainly of a π-conjugated compound. Such a thin layer derived from the production process may not be regarded as a substantial constituent of the surfaces of the particles. In any case, the ink of the present invention for an EW element is defined to encompass one containing the colorant particles which are caused to have such a thin layer derived from the production process at the outermost parts thereof.

The "π-conjugated polymer" means a polymer produced from monomers capable of forming a "π-conjugated polymer". As examples of such monomers (hereinafter, each being frequently referred to as "π-conjugation-forming monomer (A)"), there can be mentioned acetylene, aniline, furan, pyrrole, thiophene and derivatives thereof. One or more of these monomers can be used as the π-conjugation-forming monomer (A).

Specific examples of π-conjugated polymers include a polyacetylene obtained by polymerizing acetylene and/or a derivative thereof, a polyaniline obtained by polymerizing aniline and/or a derivative thereof, a polyfuran obtained by polymerizing furan and/or a derivative thereof, a polypyrrole obtained by polymerizing pyrrole and/or a derivative thereof, and a polythiophene or a poly-3,4-ethylenedioxythiophene (PEDOT) obtained by polymerizing thiophene and/or a derivative thereof. Among these, a polypyrrole and PEDOT are preferred.

The π-conjugated polymer can be produced by polymerizing raw material monomers by any of the known methods such as oxidative polymerization, electrochemical polymerization, radical polymerization, coordination polymerization, condensation polymerization and coupling reaction. In the production of the π-conjugated polymer, it is possible to use any of appropriate additives (e.g., dispersion stabilizers such as a polyaniline, a polyacrylic acid, a polyvinylpyrrolidone and a polyvinyl alcohol, and surfactants such as sodium dodecyl sulfate, hexadecyltrimethylammonium bromide and a polyoxyethylene lauryl ether).

Specific examples of compounds containing only carbon atoms in skeleton thereof include carbon black, carbon nanotube and graphene. These may be in the form of agglomerates as long as the purpose of the present invention can be achieved.

The colorant particles used in the ink of the present invention for an EW element may have hydrophobized surfaces. When the colorant particles with the surfaces thereof hydrophobized are used in an ink for an EW element, the particles exhibit an excellent dispersion stability in the solvent of the ink and, hence, are unlikely to precipitate. Therefore, when the resultant ink is used for an electrowetting device, disadvantages such as non-uniform image and lowering of contrast can be suppressed. Specifically, in this case, the colorant particles can be dispersed well in a solvent having an SP (solubility parameter) value of 9.0 or less (i.e., hydrophobic solvent) even without addition of a dispersant such as a surfactant.

As the π-conjugated compound, it is preferred to use a π-conjugated polymer from the viewpoint of dispersion of the colorant particles.

From the viewpoint of color, preferably sharp black color, to be displayed, it is preferred to use a π-conjugated compound containing only carbon atoms in skeleton thereof.

The hydrophobization of the colorant particle surfaces comprising the π-conjugated compound as a main component may be carried out simultaneously with the formation of the surfaces. Alternatively, unhydrophobized surfaces may first be formed and then subjected to hydrophobization.

As specific methods for hydrophobizing the surfaces of the particles, there can be mentioned the following methods (1) and (2):
(1) Method in which the hydrophobization of the colorant particle surfaces is carried out simultaneously with the formation of the colorant particles
(2) Method in which the hydrophobization of the colorant particle surfaces is carried out after the formation of the colorant particles Of these two methods, the method (2) is preferred from the viewpoint of excellent dispersion stability of the colorant particles in the solvent. Preferred embodiments of method (2) are methods (2-1) and (2-3) described below.

The hydrophobization of the colorant particle surfaces means that a part or whole of the colorant particle surfaces has a hydrophobic area.

(1) Method in Which the Hydrophobization of the Colorant Particle Surfaces is Carried Out Simultaneously with the Formation of the Colorant Particles In this method, the polymerization for producing the π-conjugated polymer is carried out using, as a π-conjugation-forming monomer (A), at least a derivative having a hydrophobic side chain. By this method, the colorant particle surfaces can be formed while simultaneously hydrophobizing the surfaces.

As the hydrophobic side chains, there can be mentioned a linear or branched cyclic saturated hydrocarbon group and an aromatic group. The saturated hydrocarbon group preferably has 8 or more carbon atoms.

Specific examples of derivatives having a hydrophobic side chain include thiophene derivatives such as 3-butylthiophene, 3-decylthiophene, 3-dodecylthiophene, 3-ethylthiophene, 3-heptylthiophene, 3-hexylthiophene, 3-methylthiophene, 3-nonylthiophene, 3-octadecylthiophene, 3-octylthiophene, 2-bromo-3-dodecylthiophene, 3-pentylthiophene, 3-propylthiophene and 3-undecylthiophene; pyrrole derivatives such as 1-octylpyrrole, 3-octylpyrrole, 1-dodecylpyrrole, 3-dodecylpyrrole, 1-etylpyrrole, 3-heptylpyrrole, 1-octadecylpyrrole, 1-phenylpyrrole, 3-hexylpyrrole and 1-hexylpyrrole; aniline derivatives such as N-dodecylaniline, 4-octylaniline and 4-hexylaniline; and furan derivatives such as 3-methylfuran, 3-octylfuran and 3-dodecylfuran; and acetylene derivatives such as 4-hexylphenylacetylene, hexylmethylacetylene, tridecylacetylene and tetradecylacetylene, and one or more of these derivatives can be used.

(2) Method in Which the Hydrophobization of the Colorant Particle Surfaces is Carried Out After the Formation of the Colorant Particles As specific embodiments of the method in which the hydrophobization of the colorant particle surfaces is carried out after the formation of the colorant particles, there can be mentioned the following methods:
(2-1) Method in which a hydrophobic area is introduced to at least a part of the surfaces of the colorant particles by polymer adsorption;
(2-2) Method in which a hydrophobic area is introduced to at least a part of the surfaces of the colorant particles by graft reaction; and
(2-3) Method in which a hydrophobic area is introduced to at least a part of the surfaces of the colorant particles by graft polymerization.

More specific explanations are made below.

(2-1) Method in Which a Hydrophobic Area is Introduced to at Least a Part of the Surfaces of the Colorant Particles by Polymer Adsorption Specific embodiments of this method include a method (i) in which a polymer is added in the presence of the colorant particles so as to cause the polymer to be adsorbed on the surfaces of the colorant particles, and a method (ii) in which a polymerization of monomers is performed in the presence of the colorant particles so as to cause the formed polymer to be adsorbed on the surfaces of the colorant particles.

In method (i), a solution of a polymer in an organic solvent (such as toluene or undecane) is added to a dispersion of colorant particles in an inorganic solvent (such as ethanol or acetone) to thereby cause the polymer to be adsorbed on the surfaces of the colorant particles. For promoting the adsorption, it is necessary that the polymer to be adsorbed on the surfaces of the colorant particles be dissolved in an organic solvent having an SP value smaller than that of an organic solvent having the colorant particles dispersed therein. After the solution of the polymer in the organic solvent is added to the dispersion of the colorant particles, the organic solvent used for the dispersion having a higher SP value is removed. As a result, the polymer can be more strongly adsorbed on the surfaces of the colorant particles.

Examples of polymers which can be used in method (i) include poly(meth)acrylates such as a poly(dodecyl methacrylate) and a poly(2-ethylhexyl acrylate), a polystyrene, a styrene-butadiene copolymer, a styrene-isoprene copolymer, polymers of diene compounds (such as isoprene and butadiene) and hydrogenated products thereof, an alkyl vinyl ether polymer, a copolymer of an α-olefin and an alkyl vinyl ether, and a copolymer of an α-olefin and a diene compound.

The amount of the polymer is preferably 10 to 1,000 parts by mass, more preferably 50 to 500 parts by mass, with respect to 100 parts by mass of the colorant particles.

The mass average molecular weight of the polymer is preferably 10,000 to 1,000,000.

In method (ii), a polymerization of monomers is performed in the presence of the colorant particles dispersed in an organic solvent such as ethanol so as to cause the formed polymer to be adsorbed on the surfaces of the colorant particles.

As the polymerizable monomers used in method (ii), there can be mentioned polymerizable monomers usable as a monomer (C) described below which has a hydrophobic side chain.

The amount of the polymerizable monomer may be the same as in the case of method (i).

The above-mentioned amounts of the polymers and the polymerizable monomers in methods (i) and (ii) are those used for the production processes and do not necessarily coincide with the amounts of the polymers adsorbed on the surfaces of the colorant particles.

(2-2) Method in Which a Hydrophobic Area is Introduced to at Least a Part of the Surfaces of the Colorant Particles by Graft Reaction Specifically, it is preferred to perform this method in a manner wherein, as a preliminary treatment, reactive functional groups such as a hydroxyl group are introduced in advance to the surfaces of the colorant particles, and then a compound having a hydrophobic side chain (such as a silane coupling agent having a reactivity with the above-mentioned reactive functional group) is graft reacted with the colorant particles in a solvent such as ethanol.

As examples of methods for performing the preliminary treatment to introduce the reactive functional groups to the surfaces of the colorant particles, there can be mentioned a method (a) in which a polymerization to produce a π-conjugated polymer is performed using at least a derivative having a reactive functional group as the π-conjugation-forming monomer (A); a method (b) in which a polymerization of the π-conjugation-forming monomer (A) to form the surfaces of the colorant particles is performed in the copresence of a polymer such as a dispersion stabilizer having a reactive functional group in a reaction system; and a method (c) in which, after the formation of the surfaces of the colorant particles by polymerization of the π-conjugation-forming monomer (A), the colorant particles are treated with a compound (reagent) having a reactive functional group.

As examples of the derivative having a reactive functional group used in method (a), there can be mentioned 3-(2-hydroxyethyl) thiophene, 3-hydroxymethyl thiophene, 1-(2-hydroxyethyl) pyrrole and 1-(3-hydroxypropyl) pyrrole, and one or more of these compounds can be used.

Examples of the dispersion stabilizer having a reactive functional group used in method (b) include polymers such as a polyvinyl alcohol having a hydroxyl group, a polyacrylic acid and a polyamine.

The dispersion stabilizer is preferably used in an amount such that the concentration of the dispersion stabilizer in the reaction system becomes, for example, 0.1 to 10% by mass.

As the compound (reagent) having a reactive functional group used in method (c), a compound having a hydroxyl group can be used. Examples of the compound having a hydroxyl group include 2,2'-azobis[2-methyl-N-(2-hydroxyethyl)propionamide and 2,2'-azobis{[2-methyl-N-(1,1-bis(hydroxymethyl)-2-hydroxyethyl]propionamide}, and one or more of these compounds can be used.

Each of these compounds is preferably used in an amount of 0.1 to 10 parts by mass with respect to 100 parts by mass of the π-conjugation-forming monomer (A).

After the reactive functional groups are introduced to the surfaces of the colorant particles by the preliminary treatment, the compound having a hydrophobic side chain such as a silane coupling agent is graft reacted with the surfaces of the colorant particles. The reaction may be carried out in a single step manner or a multiple step manner.

When the reaction is carried out in a single step manner, a silane coupling agent is reacted with the colorant particle surfaces to which the reactive functional groups have been introduced by, for example, any of the above-mentioned methods (a), (b) and (c).

As the silane coupling agent, it is possible to use at least one coupling agent selected from the group consisting of a silane coupling agent (S1) having an alkyl group as a hydrophobic side chain and a silane coupling agent (S2) having a fluorinated alkyl group as a hydrophobic side chain.

As examples of the silane coupling agent (S1) having an alkyl group, there can be mentioned propyltrimethoxysilane, butyltrimethoxysilane, hexyltrimethoxysilane, decyltrimethoxysilane, dodecyltriethoxysilane, dodecyltrimethoxysilane, hexadecyltrimethoxysilane, octadecyltrimethoxysilane, propyldodecyltrichlorosilane, butyltrichlorosilane, hexyltrichlorosilane, decyltrichlorosilane, dodecyltrichlorosilane, hexadecyltrichlorosilane, octadecyltrichlorosilane, isopropyl triisoisostealoyl titanate, isopropyl trioctanoyl titanate and acetoalkoxy aluminum diisopropionate. One or more of these compounds can be used as the silane coupling agent (S1).

Among these compounds usable as the silane coupling agent (S1), preferred are those having an alkyl chain having 8 or more carbon atoms, and more preferred are decyltrimethoxysilane, dodecyltriethoxysilane, dodecyltrimethoxysilane, hexadecyltrimethoxysilane, octadecyltrimethoxysilane, propyldodecyltrichlorosilane and the like.

As examples of the silane coupling agent (S2) having a fluorinated alkyl group as a hydrophobic side chain, there can be mentioned (3,3,3-trifluoropropyl)trimethoxysilane, (3,3,3-trifluoropropyl)methyldimethylsilane, (3,3,3-trifluoropropyl)dimethylchlorosilane, nonafluorohexyltrimethoxysilane, nonafluorohexyldimethylchlorosilane, tridecafluoro-1,1,2,2-tetrahydrooctyltrimethoxysilane, tridecafluoro-1,1,2,2-tetrahydrooctylmethyldimethychlorolsilane, heptadecafluoro-1,1,2,2-tetrahydrodecyltrimethoxysilane, heptadecafluoro-1,1,2,2-tetrahydrodecyl methyldichlorosilane, and heptadecafluoro-1,1,2,2-tetrahydrodecyldimethylchlorosilane. These compounds can be used individually or in any combination.

Among these compounds usable as the silane coupling agent (S2), preferred are (3,3,3-trifluoropropyl)trimethoxysilane, nonafluorohexyltrimethoxysilane, tridecafluoro-1,1,2,2-tetrahydrooctyltrimethoxysilane, heptadecafluoro-1,1,2,2-tetrahydrodecyltrimethoxysilane and the like, and more preferred are those having a fluorinated alkyl chain having 3 or more carbon atoms.

The amount of the silane coupling agent (S1) and/or the silane coupling agent (S2) which are used for the graft reaction is preferably 0.1 to 5 parts by mass with respect to 100 parts by mass of the colorant particles after the preliminary treatment. When the silane coupling agent(s) is used in such an amount, the surfaces of the colorant particles can be sufficiently hydrophobized. The above-mentioned amount of the silane coupling agent (S1) and/or the silane coupling agent (S2) is that used for the reaction and does not necessarily coincide with the amount of the compound actually reacted with the surfaces of the colorant particles.

The graft reaction in a multiple step manner can be carried out by a method in which the colorant particle surfaces to which the reactive functional groups have been introduced, for example, by any of the above-mentioned methods (a), (b) and (c) are treated with, for example, a silane coupling agent (S3) having a glycidyl group, followed by modification with an alkylamine.

As examples of the silane coupling agent (S3) having a glycidyl group, there can be mentioned 3-glycidyloxypropyltrimethoxysilane, 3-glycidyloxypropyl(dimethoxy)methylsilane, and diethoxy(3-glycidyloxypropyl)methylsilane. These compounds can be used individually or in any combination. As examples of the alkylamine, there can be mentioned hexylamine, octylamine, decylamine, dodecylamine, tetradecylamine, and hexadecylamine. These compounds can be used individually or in any combination.

The amount of the silane coupling agent (S3) having a glycidyl group is preferably 0.1 to 10 parts by mass with respect to 100 parts by mass of the colorant particles after the preliminary treatment. The amount of the alkylamine is preferably 5 parts by mass or more with respect to 100 parts by mass of the colorant particles after the preliminary treatment. When the compounds are used in the above-mentioned amounts, the surfaces of the colorant particles can be sufficiently hydrophobized. The above-mentioned amounts are those used for the treatment and do not necessarily coincide with the amounts of the compounds actually reacted with the surfaces of the colorant particles.

As other methods for carrying out graft reaction in a multiple step manner, it is also possible to employ methods using an esterification reaction, an etherification reaction, a substitution reaction such as Michael addition, a condensation reaction and an addition reaction.

(2-3) Method in Which a Hydrophobic Area is Introduced to at Least a Part of the Surfaces of the Colorant Particles by Graft Polymerization Specifically, it is preferred to perform this method in a manner wherein, as a preliminary treatment, reactive functional groups such as a hydroxyl group are introduced in advance to the surfaces of the colorant particles, and then reacted with a silane coupling agent (S4) having a polymerizable functional group in a solvent such as ethanol, followed by graft polymerizing, in a solvent such as toluene, monomers (C) having a hydrophobic chain to the polymerizable functional groups introduced to the surfaces of the colorant particles.

The preliminary treatment for introducing reactive functional groups to the colorant particle surfaces can be carried out, for example, by any of the above-mentioned methods (a), (b) and (c).

As the polymerizable functional group of the silane coupling agent (S4), for example, a vinyl group and an allyl group can be used. From the viewpoint of high polymerization activity, it is preferred to use a silane coupling agent (S4) having a vinyl group, the examples of which include 3-methacryloxypropyltrimethoxysilane, 3-acryloxypropyltrimethoxysilane and vinyltrimethoxysilane. One or more compounds can be used as a silane coupling agent (S4).

As the monomer (C) having a hydrophobic side chain, it is preferred to use a polymerizable monomer (C1) having a long-chain alkyl group or a polymerizable monomer (C2) having a fluorinated alkyl group. One or more monomers can be used as monomer (C). The polymerizable monomer (C1) and/or polymerizable monomer (C2) may be used in combination with other polymerizable monomer.

As the polymerizable monomer (C1) having a long-chain alkyl group, it is possible to use (meth)acrylic esters such as pentyl acrylate, isopentyl acrylate, neopentyl acrylate, hexyl acrylate, octyl acrylate, decyl acrylate, undecyl acrylate, dodecyl acrylate, lauryl acrylate, stearyl acrylate, hexadecyl acrylate, heptadecyl acrylate, nonadecyl acrylate, arachyl acrylate, behenyl acrylate, heptasyl acrylate, nonacyl acrylate, doteriacyl acrylate, pentyl methacrylate, isopentyl methacrylate, neopentyl methacrylate, hexyl methacrylate, octyl methacrylate, decyl methacrylate, undecyl methacrylate, dodecyl methacrylate, lauryl methacrylate, stearyl methacrylate, hexadecyl methacrylate, heptadecyl methacrylate, nonadecyl methacrylate, arachyl methacrylate, behenyl methacrylate, heptasyl methacrylate, nonacyl methacrylate and doteriacyl methacrylate. These compounds can be used individually or in any combination. Among these, preferred are alkyl (meth)acrylates where the alkyl group has 8 or more carbon atoms, such as stearyl acrylate.

As the polymerizable monomer (C2) having a fluorinated alkyl group, it is possible to use (meth)acrylic esters such as 1,1,2,2-nonafluorohexyl acrylate, 2-(perfluorohexyl) ethyl acrylate, 2-(perfluorobutyl) ethyl methacrylate and 2-(perfluorohexyl) ethyl methacrylate. These compounds can be used individually or in any combination. Among these, preferred are fluoroalkyl (meth)acrylates where the fluoroalkyl group has 3 or more carbon atoms.

As examples of other polymerizable monomers used in combination with the above-mentioned polymerizable monomer (C1) and/or polymerizable monomer (C2), there can be mentioned styrenic monomers (such as styrene, methyl styrene, p-methoxy styrene, p-tert-butyl styrene, p-phenyl styrene, chlorostyrene, bromostyrene and dibromostyrene), ethylene, propylene, butylene, vinyl chloride, methyl (meth) acrylate, ethyl (meth) acrylate, propyl (meth) acrylate, n-butyl (meth) acrylate, isobutyl (meth) acrylate, benzyl (meth) acrylate, phenoxyethyl (meth) acrylate, phenyl (meth) acrylate and cyclohexyl (meth) acrylate. One or more of these compounds can be used together with the above-mentioned polymerizable monomer (C1) and/or polymerizable monomer (C2).

The amount of the silane coupling agent (S4) having a polymerizable functional group is preferably 0.1 to 10 parts by mass with respect to 100 parts by mass of the colorant particles after the preliminary treatment. The amount of the monomer (C) having a hydrophobic side chain is preferably 1 to 100 parts by mass with respect to 100 parts by mass of the colorant particles after the preliminary treatment. When these materials are used in such amounts, the surfaces of the colorant particles can be sufficiently hydrophobized. The above-mentioned amounts are those of the materials used for the production process and do not necessarily coincide with the amounts of the materials reacted with the surfaces of the colorant particles.

The graft polymerization as explained above is an example of the method employing a radical polymerization; however, the method of graft polymerization is not limited to one employing a radical polymerization, and a cationic polymerization or an anionic polymerization can also be employed.

In the case of an embodiment of the present invention where the surfaces of the colorant particles contained in the ink for an EW element are formed of the π-conjugated compound as a main component, there is no particular limitation with respect to the materials used for portions other than the surfaces of the colorant particles.

The specific embodiments of the colorant particles include, as mentioned above, an embodiment where the particles have a monolayer structure and an embodiment where the particles have a composite structure (core-shell structure). The core of the particles may be multi-layered.

In the case of the core-shell structure, the compositions of the core and the shell may be exactly the same.

The core may be formed of an organic material or may be formed of at least one of a metal and a metal compound. When the colorant particles have such a core-shell structure, it becomes possible to impart the colorant particles with different functions that are respectively attributable to the core and the shell.

As the organic material which can be used for forming the core of the particles, it is possible to use a polymer of a π-conjugated compound or other compounds. For example, it is possible to use any of the polymers mentioned below that are free from or unlikely to cause discoloration.

Examples of such polymers include polymers of the following polymerizable monomers: olefins and derivatives thereof, such as ethylene, propylene, butylenes and methylpentene; styrene and derivatives thereof, such as styrene, α-methylstyrene, p-methylstyrene, p-chlorostyrene, divinylbenzene and chloromethylstyrene; vinyl esters, such as vinyl fluoride, vinyl chloride, vinyl acetate and vinyl propionate; unsaturated nitriles, such as acrylonitrile; (meth)acrylic esters and derivatives thereof, such as methyl (meth) acrylate, ethyl (meth) acrylate, butyl (meth) acrylate, 2-ethylhexyl (meth) acrylate, stearyl (meth)acrylate, ethylene glycol (meth) acrylate, trifluoroethyl (meth) acrylate, pentafluoropropyl (meth) acrylate and cylcohexyl (meth) acrylate; dicarboxylic acids, such as phthalic acid; diamines; diallyl phthalate; benzoguanamine; and triallyl isocyanate. One or more of these monomers can be used as the polymerizable monomer.

As examples of other polymers that are free from or unlikely to cause discoloration, these can be mentioned a polyamide, a (un)saturated polyester, a polyethylene terephthalate, a polysulfone, a polyphenylene oxide, a polyacetal, a polyimide, a polyamide imide, a polyetheretherketone, a polyethersulfone, an epoxy resin, a phenol resin, a melamine resin and a benzoguanamine resin, and one or more of these polymers can be used.

As a more preferred core-shell structure, there can be mentioned a structure wherein the shell comprises a polypyrrole (π-conjugated polymer) capable of exhibiting an excellent blackness, and the core comprises a polystyrene which has a low specific gravity and is effective for giving a high charge to the particles and controlling particle diameter.

The colorant particles having a core-shell structure to be used in the ink of the present invention for an EW element can be obtained by a method in which the π-conjugation-forming monomer (A) for forming the shell is polymerized in the presence of particles for forming the cores by an interfacial precipitation polymerization, an interfacial polymerization or an interfacial grant polymerization, while effecting the hydrophobization of the surfaces of the colorant particles by any of the above-mentioned methods (1), (2) and the like during or after the polymerization of the π-conjugation-forming monomer (A).

For producing colorant particles (preferably black particles) with cores thereof formed of at least one of a metal and a metal compound, any of the metals and metal compounds exemplified below can be used.

As examples of the metals, there can be mentioned metals belonging to Groups 4 to 14 of the periodic table, and alloys containing any of these metals as a main component. As examples of the metal compounds, there can be mentioned oxides, nitrides and carbides of the metals exemplified above. One or more of these metals and/or metal compounds can be used.

Specific examples of the metals include iron, ruthenium, cobalt, rhodium, nickel, palladium, platinum, copper, silver, gold, silicon, germanium and tin. Specific examples of the alloys include a stainless steel and a solder. Specific examples of the oxides, nitrides and carbides include an aluminum oxide, a silicon oxide, a titanium oxide (titanium black), an iron oxide, a zinc oxide, an indium oxide, a tin oxide, an indium tin oxide, a zinc aluminum oxide, a zinc gallium oxide, a silicon nitride and a silicon carbide.

Among these, when the colorant particles used in the present invention are black, it is preferred to use metal compounds such as titanium black, an iron oxide and a silicon carbide.

Metals and metal compounds generally have a high specific gravity. However, any of the metals and the metal compounds can be used for the colorant particles when the core-shell structure is employed as the structure of the colorant particles while forming the shell with the π-conjugated polymer which is an organic material.

The colorant particles containing at an inner portion thereof the above-mentioned π-conjugated compound can also be used in one of the embodiments of the present invention. As a material for forming such colorant particles containing at an inner portion thereof the above-mentioned π-conjugated compound, any of the above-mentioned organic materials used for forming the core can be used. Such colorant particles may also contain any of the above-mentioned metals or metal compounds.

It is preferred that the colorant particles have a specific gravity or 2 or less and an average particles diameter of 20 to 300 nm.

When the specific gravity of the colorant particles exceeds 2, the dispersion stability of the colorant particles in the solvent becomes poor. When the specific gravity of the colorant particles is 2 or less, the dispersion stability of the colorant particles becomes excellent. The preferred lower limit of the specific gravity of the particles depends on the specific gravity of the solvent etc. and may, for example, be the same as the specific gravity of the solvent.

The average particle diameter of the colorant particles is preferably 20 to 80 nm from the viewpoint of dispersibility of the particles and is preferably 80 to 300 nm from the viewpoint of the hiding power (light shielding property) of the ink.

In view of the balance between the dispersibility and hiding power, the average particle diameter of the colorant particles is preferably 30 to 160 nm, more preferably 30 to 120 nm, and still more preferably 60 to 120 nm.

The average particle diameter of the colorant particles (preferably black particles) can be controlled by any of the known methods where the control is effected, for example, with the use of a dispersion stabilizer, the use of an emulsifier, the adjustment of particle charge, the adjustment of microchannel diameter, or the operation for agitation, which are performed during the production of the colorant particles.

For example, when the colorant particles have a core-shell structure, the average diameter of the colorant particles can be controlled, for example, by a method in which the formation of cores (e.g., polystyrene cores) is performed in the copresence of a charged monomer (such as sodium parastyrene sulfonate), and the amount of the charged monomer and/or the amount of the polymerization initiator is adjusted to control the diameter of the cores.

In this specification, the average particle diameter means a diameter at cumulative 50% in the particle diameter distribution measured by a dynamic light scattering particle diameter distribution analyzer.

Further, it is preferred that the average particle diameter is measured under the so-called "monodispersion" condition where the CV value (coefficient of variation of particle diameter) is 15% or less and the aggregation of the particles is suppressed. The CV value varies depending on, for example, the type of the solvent used for dispersing the particles for the measurement. Therefore, it is preferred that the measurement of the particle diameter is carried out with the particles dispersed in such a solvent as can provide the lowest CV value. The CV value can be calculated by the following formula:

$$\text{Standard deviation of particle distribution} \div \text{average diameter} \times 100$$

The solvent for the ink of the present invention for an EW element can be appropriately selected according to the intended use of the ink, and either a single type of solvent or a combination of two of more types of solvents may be used. For using the solvent as the low surface energy liquid, it is preferred to use a hydrophobic solvent having an SP value of 9.0 or less. Especially when, as mentioned above, the solvent is used as the low surface energy liquid of an EW element constituting an EWD, it is preferred to use a linear or branched alkane, such as octane (SP value: 7.5; specific gravity: 0.70), nonane (SP value: 7.5; specific gravity: 0.72), decane (SP value: 7.6; specific gravity: 0.74), undecane (SP value: 7.6; specific gravity: 0.74) and dodecane (SP value: 7.7; specific gravity: 0.75). Further, aromatic solvents, such as toluene (SP value: 8.8; specific gravity: 0.87) and xylene (SP value: 8.8; specific gravity: 0.88), can also be used.

With respect to the specific gravity of the colorant particles (preferably black particles) and the specific gravity of the solvent, it is preferred that the specific gravity of the colorant particles (preferably black particles) is larger than the specific gravity of the solvent and the difference therebetweeeh is 1.0 or less.

The melting point of the solvent is preferably −10° C. or less, more preferably −20° C. or less, still more preferably −40° C. or less. The boiling point of the solvent is preferably 80° C. or more, more preferably 120° C. or more, still more preferably 150° C. or more. When the melting point and the boiling point of the solvent are in the above-mentioned ranges, it is possible to suppress the solidification/crystallization and the vaporization/boiling during the general use or the storage of the solvent.

When the ink for an EW element is used as the low surface energy liquid for an EW element, it is preferred that the surface energy of the ink is 35 mJ/$m^2$ or less. When the surface energy exceeds 35 mJ/$m^2$, this may cause a disadvantage that a mixing of the ink with the high surface energy liquid occurs in the cell. The surface energy of the ink is more preferably 30 mJ/$m^2$ or less and still more preferably 20 mJ/$m^2$ or less.

When the viscosity of the ink for an EW element is high, the operating speed of the device is lowered; therefore, the viscosity of the ink at an operation temperature is preferably 100 mPa·s or less, more preferably 30 mPa·s or less, and still more preferably 10 mPa·s or less.

The content of the solvent in the ink for an EW element is preferably in the range of from 50 to 95% by mass, more preferably from 70 to 95% by mass.

The ink for an EW element can be produced by mixing the above-mentioned colorant particles (preferably black particles) with the above-mentioned solvent. Besides the colorant particles and the solvent, if necessary, any of the additives such as an antioxidant, a ultraviolet light blocking agent, a stabilizer, a dispersant (such as a surfactant) and a hydrophobic electrolyte may be added to the ink. However, since the colorant particles contained in the ink of the present invention for an EW element have hydrophobic surfaces and, hence, exhibits excellent dispersion stability, it is not necessary to add a dispersant such as a surfactant. When an ink for an EW element containing a large amount of dispersant is used as the low surface energy liquid, this may cause a disadvantage that a mixing of the ink with the low surface energy liquid occurs in the cell. Such a disadvantage can be avoided according to the present invention since the dispersant, even if used, need not be used in a large amount.

With respect to the use of the ink of the present invention, there is no particular limitation so long as it is used for forming an electrowetting device. As examples of electrowetting devices, there can be mentioned an EWD and a shutter device. Regarding the EWD, there are a reflective type EWD and a transmissive type EWD. Since the ink of the present invention excels especially in hiding power, remarkable effects can be obtained when the ink of the present invention for an EW element is used for a transmissive type EWD. The shutter device is a device which exhibits a shutter function by associating the change in interface morphology between the high surface energy liquid and the low surface energy liquid with the opening and closing of the shutter. As to such a shutter device, reference can be made, for example, to Japanese Unexamined Patent Publication No. 2010-276716.

The electrowetting device of the present invention comprises a high energy liquid as a first liquid material and a low energy liquid as a second liquid material (having a lower surface energy than the first liquid material) which are immiscible with each other, the second liquid material being the ink of the present invention for an electrowetting element, wherein the first liquid material and the second liquid material are accommodated in a cell formed between a first substrate and a second substrate which are positioned opposite to each other.

It is preferred that the solubility parameter of the high energy liquid is 14 or more, and the solubility parameter of the low energy liquid is 9 or less.

The electrowetting device of the present invention may have a structure as shown in FIG. 1 as EWD 100. Examples of the high surface energy liquid include water, an aqueous electrolyte solution, an ionic liquid and a polyhydric alcohol such as ethylene glycol, propylene glycol or glycerin, and one or more of these liquids can be used.

With respect to the surface energy of the high surface energy liquid, from the viewpoint of suppressing the mixing with the low surface energy liquid, the surface energy is preferably 45 mJ/$m^2$ or more, more preferably 55 mJ/$m^2$ or more, and still more preferably 65 mJ/$m^2$ or more. As regards the melting point and the boiling point of the high surface energy liquid, the preferred ranges and the reasons therefor are the same as mentioned in connection with the low surface energy liquid (ink for an EW element). The high surface energy liquid may further contain additives, ions etc. for purposes such as increasing of surface energy and adjustment of melting point or boiling point.

With respect to the colorant particles contained in the ink of the present invention for an EW element, which comprise a π-conjugated compound, preferably comprise, on the surfaces thereof, a π-conjugated compound, and more preferably comprise, on the surfaces thereof, the π-conjugated compound as a main component, the surfaces of the colorant particles are hydrophobized and, hence, exhibits an excellent dispersion stability when the particles are dispersed in a solvent to obtain an ink for an EW element. Therefore, the addition of a dispersant such as a surfactant is not necessarily needed in the case of the ink of the present invention for an EW element. The addition of a surfactant may cause a disadvantage that, when the ink for an EW element is used as the low surface energy liquid, the surfactant facilitates the mixing between the low surface energy liquid with the high surface energy liquid which are accommodated in the cell of the electrowetting device while being in contact with each other. Such a mixing has an unfavorable influence on the desired operation of the electrowetting device. Therefore, for the electrowetting device which has a structure in which the low surface energy liquid and the high surface energy liquid contact each other in a cell, it is a great advantage that the colorant particles (preferably black particles) per se have an excellent dispersion stability so that the addition of a dispersant such as a surfactant is not necessarily needed when the colorant particles are used in an ink for an EW element.

EXAMPLES

Hereinbelow, the present invention will be explained in greater detail with reference to the following Examples.

In the Examples, "%" used for concentrations means "% by mass" unless otherwise specified.

Production Example 1

Colorant particles having a core-shell structure in which the core is formed of a polystyrene and the shell is formed of a polypyrrole were produced as follows.

Into a 1,000-mL separable flask equipped with a four-necked separable cover, a stirring blade, a three-way cock, a condenser and a temperature probe were weighed 52 g of styrene (manufactured by Wako Pure Chemical Industries, Ltd.), 0.4 g of sodium parastyrene sulfonate (manufactured by Wako Pure Chemical Industries, Ltd.), 0.25 g of potassium persulfate (manufactured by Wako Pure Chemical Industries, Ltd.) as a polymerization initiator and 500 g of a distilled water, followed by stirring at 200 rpm, to thereby perform a polymerization in a nitrogen atmosphere at 70° C. for 12 hours.

The resultant aqueous dispersion of resin microparticles was subjected to an ultrasonic dispersion twice using a centrifugation and a distilled water, to thereby perform a removal/wash away of unreacted monomers, initiator and the like. As a result, a dispersion [1] of polystyrene particles for forming cores was obtained.

With respect to the polystyrene particles in the obtained dispersion [1], the particle diameters were measured by a dynamic light scattering particle diameter distribution analyzer (NICOMP 380ZLS manufactured by PSS•NICOMP PARTICLE SIZING SYSTEMS). As a result, the average particle diameter of the polystyrene particles was found to be 110 nm.

Then, into a 500-mL separable flask were weighed 100 g of a 1% by mass dilution of the dispersion [1] of polystyrene particles, 20 g of a 5% by mass aqueous solution of a polyvinyl alcohol (GL03 manufactured by The Nippon Synthetic Chemical Industry Co., Ltd.) and 20 g of a 5% by mass aqueous solution of ammonium lauryl sulfonate (manufactured by Wako Pure Chemical Industries, Ltd.), followed by attachment of a separable cover and a stirring blade, and stirring at 100 rpm.

Then, 4 g of pyrrole (manufactured by Wako Pure Chemical Industries, Ltd.) was added to the flask and the temperature was elevated to 60° C. To the resultant mixture was dropwise added over 5 hours a solution obtained by dissolving 13.5 g of ammonium persulfate (manufactured by Wako Pure Chemical Industries, Ltd.) as a polymerization initiator in 100 g of an ion exchanged water. After completion of the dropwise addition, the mixture was further stirred for 8 hours while heating, followed by cooling to terminate the reaction, to thereby obtain a dispersion containing black-colored colorant particles [1] having a polystyrene core and a polypyrrole shell.

The particle diameters of the obtained colorant particles [1] were measured by the same dynamic light scattering particle diameter distribution analyzer as mentioned above, and the average particle diameter of the colorant particles [1] was found to be 160 nm.

Then, the dispersion of colorant particles [1] was subjected to an ultrasonic dispersion twice using a centrifugation and a 1% by mass aqueous solution of ammonium lauryl sulfate and, then, further subjected to an ultrasonic dispersion twice using a centrifugation and a 1% by mass aqueous solution of ammonium lauryl sulfate and ethanol, thereby obtaining a 1% by mass ethanol dispersion of the colorant particles [1].

50 g of the obtained 1% by mass ethanol dispersion of the colorant particles [1] was weighed into a 100 mL beaker, followed by addition of 1 g of dodecyltriethylsilane, followed by stirring for 12 hours with a stirrer. The resultant was subjected to an ultrasonic dispersion twice using a centrifugation and ethanol and, then, further subjected to an ultrasonic dispersion twice using a centrifugation and undecane, thereby obtaining an undecane dispersion of the colorant particles [1].

The obtained undecane dispersion of the colorant particles [1] was dried and the specific gravity of the dried product was measured by a true specific gravity meter (Accupyc manufactured by Shimadzu Corporation) and found to be 1.63 g/cm$^3$.

Production Example 2

The same procedure as in Production Example 1 was repeated except that, in the production of the core, the amount of sodium parastyrene sulfonate (manufactured by Wako Pure Chemical Industries, Ltd.) was changed to 0.2 g, and the amount of potassium persulfate (manufactured by Wako Pure Chemical Industries, Ltd.) as a polymerization initiator was changed to 0.1 g, to thereby obtain a dispersion [2] of polystyrene particles.

With respect to the polystyrene particles in the obtained dispersion [2], the particle diameters were measured by the same dynamic light scattering particle diameter distribution analyzer as mentioned above, and the average particle diameter of the polystyrene particles was found to be 242 nm.

Then, following the same procedure as in Production Example 1, the shell formation was conducted to obtain a dispersion of black-colored colorant particles [2].

The particle diameters of the obtained colorant particles [2] were measured by the same dynamic light scattering particle diameter distribution analyzer as mentioned above, and the average particle diameter of the colorant particles [2] was found to be 355 nm.

Further, following the same procedure as in Production Example 1, an undecane dispersion of the colorant particles [2] was obtained.

The obtained undecane dispersion of the colorant particles [2] was dried and the specific gravity of the dried product was measured by a true specific gravity meter (Accupyc manufactured by Shimadzu Corporation) and found to be 1.63 g/cm$^3$.

Production Example 3

Organic/inorganic composite colorant particles having a core-shell structure in which the core is formed of a polypyrrole and the shell is formed of titania were produced as follows.

Into a 1,000-mL separable flask equipped with a four-necked separable cover, a stirring blade, a three-way cock, a condenser and a temperature probe were weighed 5 g of pyrrole (manufactured by Wako Pure Chemical Industries, Ltd.), 0.5 g of a polyvinylpyrrolidone (K30 manufactured by Wako Pure Chemical Industries, Ltd.) as a dispersion stabilizer and 400 g of a distilled water, followed by stirring at 100 rpm and room temperature in a nitrogen atmosphere.

To the resultant mixture was dropwise added over 5 hours a solution obtained by dissolving 13.5 g of ammonium persulfate (manufactured by Wako Pure Chemical Industries, Ltd.) as a polymerization initiator in 100 g of a distilled water. After completion of dropwise addition, the resultant mixture was stirred for 8 hours to perform a polymerization.

The resultant aqueous dispersion of resin microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, a dispersion [3] of polypyrrole particles for forming cores in ethanol was obtained.

With respect to the obtained dispersion [3], the particle diameters of polypyrrole particles were measured by the dynamic light scattering particle diameter distribution analyzer as mentioned above, and the average particle diameter of the polypyrrole particles was found to be 120 nm.

Then, into a 500-mL separable flask were weighed 200 g of a 1% by mass dilution of the dispersion [3] of polypyrrole particles, and 20 g of a 5% by mass aqueous solution of ammonium lauryl sulfonate (manufactured by Wako Pure Chemical Industries, Ltd.) as a dispersion stabilizer, followed by attachment of a separable cover and a stirring blade, and stirring at room temperature at 100 rpm. Then, 10 g of a 10% aqueous ammonia (manufactured by Wako Pure Chemical Industries, Ltd.) was added to the flask.

To the resultant mixture was dropwise added over 10 hours a solution obtained by diluting 20 g of titanium isopropoxide (manufactured by Wako Pure Chemical Industries, Ltd.) with 50 g of ethanol. After completion of the dropwise addition, the mixture was further stirred for 8 hours to perform a reaction, thereby obtaining a dispersion of black-colored colorant particles [3] having a polypyrrole core and a titania shell.

The particle diameters of the obtained colorant particles [3] were measured by the same dynamic light scattering particle diameter distribution analyzer as mentioned above, and the average particle diameter of the colorant particles [3] was found to be 150 nm.

Then, the dispersion of colorant particles [3] was subjected to an ultrasonic dispersion twice using a centrifugation and a 1% by mass aqueous solution of ammonium lauryl sulfate and, then, further subjected to an ultrasonic dispersion twice using a centrifugation and a 1% by mass aqueous solution of ammonium lauryl sulfate and ethanol, thereby obtaining a 1% by mass ethanol dispersion of the colorant particles [3].

50 g of the obtained 1% by mass ethanol dispersion of the colorant particles [3] was weighed into a 100 mL beaker, followed by addition of 1 g of dodecyltriethylsilane, followed by stirring for 12 hours with a stirrer. The resultant was subjected to an ultrasonic dispersion twice using a centrifugation and ethanol and, then, further subjected to an ultrasonic dispersion twice using a centrifugation and undecane, thereby obtaining an undecane dispersion of the colorant particles [3].

The obtained undecane dispersion of the colorant particles [3] was dried and the specific gravity of the dried product was measured by a true specific gravity meter (Accupyc manufactured by Shimadzu Corporation) and found to be 2.90 g/cm$^3$.

Example 1

With respect to the undecane dispersion of the colorant particles [1] obtained in Production Example 1, the concentration of the colorant particles [1] in undecane was adjusted to 20% by mass to thereby obtain a black ink [1] for an EW element.

Then, the dispersion stability and the hiding power of the black ink [1] were evaluated by the following methods. The results are shown in Table 1.

(Dispersion Stability)

10 mL of the black ink [1] was added to a measuring cylinder with stopper having an outer diameter of 14 mm and a capacity of 10 mL, and allowed to stand at room temperature for 1 week. Then, the resultant was visually observed to check the presence or absence of supernatant, and evaluations were made based on the following criteria.

A=No supernatant observed

B=Supernatant clearly observed (Hiding Power)

A 3 cm×4 cm cell was made in which the gap between two glass plates was adjusted to 10 µm through a spacer. The black ink [1] was charged into the cell, and the cell was placed on a hiding ratio measuring paper (manufactured by TP Giken Co., Ltd.) so that the border between the white and black parts of the paper is covered by the cell. Then, the resultant was visually observed to evaluate the hiding power based on the following criteria.

A: Paper completely hidden by the cell and white-black border unrecognizable

B: White-black border recognizable through the cell

Comparative Example 1

With respect to the undecane dispersion of the colorant particles [2] obtained in Production Example 2, the concentration of the colorant particles [2] in undecane was adjusted to 20% by mass to thereby obtain a black ink [2] for an EW element. Then, the dispersion stability and the hiding power of the black ink [2] were evaluated by the same methods as in Example 1. The results are shown in Table 1.

Comparative Example 2

With respect to the undecane dispersion of the colorant particles [3] obtained in Production Example 3, the concentration of the colorant particles [3] in undecane was adjusted to 20% by mass to thereby obtain a black ink [3] for an EW element. Then, the dispersion stability and the hiding power of the black ink [3] were evaluated by the same methods as in Example 1. The results are shown in Table 1.

Comparative Example 3

With respect to the undecane dispersion of the colorant particles [1] obtained in Production Example 1, the concentration of the colorant particles [1] in undecane was adjusted to 1% by mass to thereby obtain a black ink [4] for an EW element. Then, the dispersion stability and the hiding power of the black ink [4] were evaluated by the same methods as in Example 1. The results are shown in Table 1.

Comparative Example 4

With respect to the undecane dispersion of the colorant particles [1] obtained in Production Example 1, the concentration of the colorant particles [1] in undecane was adjusted to 60% by mass to thereby obtain a black ink [5] for an EW element. Then, the dispersion stability and the hiding power of the black ink [5] were evaluated by the same methods as in Example 1. The results are shown in Table 1.

TABLE 1

| | Colorant particles | | | Evaluation of ink for EW element | | |
|---|---|---|---|---|---|---|
| | Type | Average particle diameter | Specific gravity | Content (% by mass) | Dispersion stability | Hiding power | Observation |
| Ex. 1 | [1] | 160 | 1.63 | 20 | A | A | Dispersion stability and hiding power are both excellent |
| Comp. Ex. 1 | [2] | 355 | 1.63 | 20 | B | A | Poor dispersion due to large particle diameter |
| Comp. Ex. 2 | [3] | 150 | 2.90 | 20 | B | A | Poor dispersion due to large specific gravity |
| Comp. Ex. 3 | [1] | 160 | 1.63 | 1 | A | B | Poor hiding power due to low colorant particle content |
| Comp. Ex. 4 | [1] | 160 | 1.63 | 60 | B | A | Poor hiding power due to particle aggregation |

As can be seen from Table 1, the black ink (ink for an EW element) of the Example is excellent both in dispersion stability and hiding power.

Example 2

Next, black particles formed of a polypyrrole with hydrophobized surfaces were produced as follows.

Into a 1,000-mL separable flask equipped with a four-necked separable cover, a stirring blade, a three-way cock, a condenser and a temperature probe were weighed 4 g of pyrrole (manufactured by Wako Pure Chemical Industries, Ltd.), 250 g of a distilled water, 100 g of a 5% by mass aqueous solution of a polyvinyl alcohol (GL03 manufactured by The Nippon Synthetic Chemical Industry Co., Ltd.) as a dispersion stabilizer, and 50 g of a 5% by mass aqueous solution of ammonium lauryl sulfate (manufactured by Kao Corporation), followed by stirring at 200 rpm.

To the resultant mixture was dropwise added over 5 hours a solution obtained by dissolving 13.5 g of ammonium persulfate (manufactured by Wako Pure Chemical Industries, Ltd.) as a polymerization initiator in 100 g of an ion exchanged water. After completion of the dropwise addition, the mixture was stirred at room temperature for 12 hours, to thereby obtain a dispersion containing black particles [1] formed of a polypyrrole.

Then, the dispersion of black particles [1] was subjected to an ultrasonic dispersion twice using a centrifugation and a 1% by mass aqueous solution of ammonium lauryl sulfate and, then, further subjected to an ultrasonic dispersion twice using a centrifugation and a 1% by mass aqueous solution of ammonium lauryl sulfate and ethanol, thereby obtaining a 1% by mass ethanol dispersion of the black particles [1].

200 g of the obtained 1% by mass ethanol dispersion of the black particles [1] was weighed into a 500-mL separable flask, followed by addition of 0.2 g of dodecyltriethoxysilane (manufactured by Tokyo Chemical Industry Co., Ltd.) and 1 g of a 28% aqueous ammonia (manufactured by Wako Pure Chemical Industries, Ltd.). The resultant mixture was stirred for 12 hours, to thereby obtain black particles [1-1] having hydrophobized surfaces.

With respect to the obtained black particles [1-1] in ethanol, the particle diameters were measured by a dynamic light scattering particle diameter distribution analyzer (NICOMP 380ZLS manufactured by PSS•NICOMP PARTICLE SIZING SYSTEMS). As a result, the average particle diameter of the black particles [1-1] was found to be 110 nm, and the CV value was found to be 12%.

Then, the black particles [1-1] were subjected to an ultrasonic dispersion twice using a centrifugation and ethanol and, then, further subjected to an ultrasonic dispersion twice using a centrifugation and toluene, thereby obtaining a toluene dispersion (ink for an electrowetting element) [1A] of the black particles [1-1] having hydrophobized surfaces.

Further, following the same procedure as mentioned above except that toluene was replaced by octane, an octane dispersion (ink for an electrowetting element) [1B] of the black particles [1-1] having hydrophobized surfaces was obtained.

The obtained toluene dispersion of the black particles [1-1] was dried and the specific gravity of the dried product was measured by a true specific gravity meter (Accupyc manufactured by Shimadzu Corporation) and found to be 1.69 g/cm$^3$.

With respect to each of the toluene dispersion [1A] and the octane dispersion [1B], the particle diameters of the black particles [1-1] were measured by the same dynamic light scattering particle diameter distribution analyzer as mentioned above. As a result, it was found that the black particles [1-1] in the toluene dispersion [1A] had an average particle diameter of 120 nm and a CV value of 12%, whereas the black particles [1-1] in the octane dispersion [1B] had an average particle diameter of 122 nm and a CV value of 11%.

Thus, it is apparent that the black particles [1-1] were monodispersed well both in toluene and octane.

Further, the toluene dispersion [1A] and the octane dispersion [1B] were allowed to stand for 300 hours, whereafter the particle diameters of the black particles were measured again. As a result, it was found that the black particles in the toluene dispersion [1A] had an average particle diameter of 121 nm and a CV value of 12% which are almost the same as measured before the 300 hours of standing, indicating that the particles have a high dispersion stability. The black particles in the octane dispersion [1B] had an average particle diameter of 138 nm and a CV value of 15% which are both increased to some extent as compared to those measured before the 300 hours of standing, and a slight aggregation of the particles was observed; however, the dispersion stability of the particles is good and satisfactory.

From these results, it is apparent that both of the toluene dispersion [1A] and the octane dispersion [1B] can be advantageously used as an ink for an electrowetting element.

Example 3

Black particles having hydrophobized surfaces and a core-shell structure in which the core is formed of a polystyrene and the shell is formed of a polypyrrole were produced as follows.

Into a 1,000-mL separable flask equipped with a four-necked separable cover, a stirring blade, a three-way cock, a condenser and a temperature probe were weighed 52 g of styrene (manufactured by Wako Pure Chemical Industries, Ltd.), 0.4 g of sodium parastyrene sulfonate (manufactured by Wako Pure Chemical Industries, Ltd.), 0.25 g of potassium persulfate (manufactured by Wako Pure Chemical Industries, Ltd.) and 500 g of a distilled water, followed by stirring at 200 rpm, to thereby perform a polymerization in a nitrogen atmosphere at 70° C. for 12 hours.

The resultant aqueous dispersion of resin microparticles was subjected to an ultrasonic dispersion twice using a centrifugation and a distilled water, to thereby perform a removal/wash away of unreacted monomers, initiator and the like. As a result, a dispersion [2] of polystyrene particles for forming cores was obtained.

Then, into a 500-mL separable flask were weighed 100 g of a 1% by mass dilution of the dispersion [2] of polystyrene particles, 20 g of a 5% by mass aqueous solution of a polyvinyl alcohol (GL03 manufactured by The Nippon Synthetic Chemical Industry Co., Ltd.) as a dispersion stabilizer and 20 g of a 5% by mass aqueous solution of ammonium lauryl sulfate (manufactured by Kao Corporation), followed by attachment of a separable cover and a stirring blade, and stirring at 100 rpm.

Then, 4 g of pyrrole (manufactured by Wako Pure Chemical Industries, Ltd.) was added to the flask and the temperature was elevated to 60° C. To the resultant mixture was dropwise added over 5 hours a solution obtained by dissolving 13.5 g of ammonium persulfate (manufactured by Wako Pure Chemical Industries, Ltd.) as a polymerization initiator in 100 g of an ion exchanged water. After completion of the dropwise addition, the mixture was further stirred for 8 hours while heating, followed by cooling to terminate the reaction, to thereby obtain a dispersion containing black particles [2] having a polystyrene core and a polypyrrole shell.

Then, the dispersion of black particles [2] was subjected to an ultrasonic dispersion twice using a centrifugation and a 1% by mass aqueous solution of ammonium lauryl sulfate and, then, further subjected to an ultrasonic dispersion twice using a centrifugation and a 1% by mass aqueous solution of ammonium lauryl sulfate and ethanol, thereby obtaining a 1% by mass ethanol dispersion (L) of the black particles [2].

200 g of the obtained 1% by mass ethanol dispersion (L) of the black particles [2] was weighed into a 500-mL separable flask, followed by addition of 0.2 g of dodecyltriethoxysilane. The resultant mixture was stirred for 12 hours, to thereby obtain black particles [2-1] having hydrophobized surfaces.

With respect to the obtained black particles [2-1] in ethanol, the particle diameters were measured by the same dynamic light scattering particle diameter distribution analyzer as mentioned above. As a result, the average particle diameter of the black particles [2-1] was found to be 150 nm, and the CV value was found to be 12%.

Then, the black particles [2-1] were subjected to an ultrasonic dispersion twice using a centrifugation and ethanol and, then, further subjected to an ultrasonic dispersion twice using a centrifugation and toluene, thereby obtaining a toluene dispersion (ink for an electrowetting element) [2A] of the black particles [2-1] having hydrophobized surfaces.

Further, following the same procedure as mentioned above except that toluene was replaced by octane, an octane dispersion (ink for electrowetting element) [2B] of the black particles [2-1] having hydrophobized surfaces was obtained.

With respect to each of the toluene dispersion [2A] and the octane dispersion [2B], the particle diameters of the black particles [2-1] were measured by the same dynamic light scattering particle diameter distribution analyzer as mentioned above. As a result, it was found that the black particles [2-1] in the toluene dispersion [2A] had an average particle diameter of 155 nm and a CV value of 13%, whereas the black particles [2-1] in the octane dispersion [2B] had an average particle diameter of 157 nm and a CV value of 12%.

Thus, it is apparent that the black particles [2-1] were monodispersed well both in toluene and octane.

Further, the toluene dispersion [2A] and the octane dispersion [2B] were allowed to stand for 300 hours, whereafter the particle diameters of the black particles were measured again. As a result, it was found that the black particles in the toluene dispersion [2A] had an average particle diameter of 155 nm and a CV value of 13% which are almost the same as measured before the 300 hours of standing, indicating that the particles have a high dispersion stability. The black particles in the octane dispersion [2B] had an average particle diameter of 178 nm and a CV value of 15% which are both increased to some extent as compared to those measured before the 300 hours of standing, and a slight aggregation of the particles was observed; however, the dispersion stability of the particles is good and satisfactory.

From these results, it is apparent that both of the toluene dispersion [2A] and the octane dispersion [2B] can be advantageously used as an ink for an electrowetting element.

Further, the specific gravity of the black particles [2-1] was measured in the same manner as in Example 1 and found to be 1.59 g/cm$^3$.

Example 4

Black particles [2-2] having hydrophobized surfaces were produced in the same manner as in Example 2 except that 0.2 g of nonafluorohexyltrimethoxysilane (manufactured by Gelest, Inc.) is used instead of 0.2 g of dodecyltriethoxysilane.

The particle diameters of the obtained black particles [2-2] were measured by the same dynamic light scattering particle diameter distribution analyzer as mentioned above. As a result, the average particle diameter of the black particles [2-2] was found to be 150 nm, and the CV value was found to be 12%.

Then, following the same procedures as in Example 3, a toluene dispersion (ink for an electrowetting element) [3A] of the black particles [2-2] having hydrophobized surfaces and an octane dispersion (ink for an electrowetting element) [3B] of the black particles [2-2] having hydrophobized surfaces were obtained.

With respect to each of the toluene dispersion [3A] and the octane dispersion [3B], the particle diameters of the black particles [2-2] were measured by the same dynamic light scattering particle diameter distribution analyzer as mentioned above. As a result, it was found that the black particles [2-2] in the toluene dispersion [3A] had an average particle diameter of 154 nm and a CV value of 12%, whereas the black particles [2-2] in the octane dispersion [3B] had an average particle diameter of 155 nm and a CV value of 12%.

Thus, it is apparent that the black particles [2-2] were monodispersed well both in toluene and octane.

Further, the toluene dispersion [3A] and the octane dispersion [3B] were allowed to stand for 300 hours, whereafter the particle diameters of the black particles were measured again. As a result, it was found that the black particles in the toluene dispersion [3A] had an average particle diameter of 155 nm and a CV value of 12% which are almost the same as measured before the 300 hours of standing, indicating that the particles have a high dispersion stability. The black particles in the octane dispersion [3B] had an average particle diameter of 155 nm and a CV value of 12% which are the same as measured before the 300 hours of standing, indicating that the particles have a high dispersion stability.

From these results, it is apparent that both of the toluene dispersion [3A] and the octane dispersion [3B] can be advantageously used as an ink for an electrowetting element.

Example 5

Following the same procedure as in Example 2, a 1% by mass ethanol dispersion (L) of black particles [2] was obtained.

200 g of the obtained 1% by mass ethanol dispersion (L) of black particles [2] was weighed into a 500-mL separable flask, followed by addition of 0.2 g of 3-methacryloxypropyltrimethoxysilane. The resultant mixture was stirred for 12 hours to thereby obtain black particles [2'] having a polymerizable functional group introduced to the surfaces thereof.

Then, the dispersion of black particles [2'] was subjected to an ultrasonic dispersion twice using a centrifugation and a 1% by mass aqueous solution of ammonium lauryl sulfate and ethanol, thereby obtaining a 1% by mass ethanol dispersion of the black particles [2'].

200 g of the 1% by mass ethanol dispersion of the black particles [2'] was weighed into a 1,000-mL separable flask, followed by attachment of a separable cover and a stirring blade, and stirring in a nitrogen atmosphere. Then, 200 g of toluene and 2 g of dodecyl acrylate (manufactured by Wako Pure Chemical Industries, Ltd.) were added to the flask, followed by heating. When the temperature of the resultant mixture reached 70° C., a solution obtained by dissolving 0.2 g of ammonium persulfate in 1 g of a distilled water was added to the mixture, and the resultant was maintained at 70° C. for 3 hours to perform a polymerization, thereby obtaining black particles [2'-1] having hydrophobized surfaces.

With respect to the obtained black particles [2'-1] in ethanol/toluene, the particle diameters were measured by the same dynamic light scattering particle diameter distribution analyzer as mentioned above. As a result, the average particle diameter of the black particles [2'-1] was found to be 160 nm, and the CV value was found to be 13%.

Then, the black particles [2'-1] were subjected to an ultrasonic dispersion three times using a centrifugation and toluene, thereby obtaining a toluene dispersion (ink for electrowetting element) [4A] of the black particles [2'-1] having hydrophobized surfaces. Further, following the same procedure as mentioned above except that toluene was replaced by octane, an octane dispersion (ink for an electrowetting element) [4B] of the black particles [2'-1] having hydrophobized surfaces was obtained.

With respect to each of the toluene dispersion [4A] and the octane dispersion [4B], the particle diameters of the black particles [2'-1] were measured by the same dynamic light scattering particle diameter distribution analyzer as mentioned above. As a result, it was found that the black particles [2'-1] in the toluene dispersion [4A] had an average particle diameter of 165 nm and a CV value of 13%, whereas the black particles [2'-1] in the octane dispersion [4B] had an average particle diameter of 170 nm and a CV value of 12%.

Thus, it is apparent that the black particles [2'-1] were monodispersed well both in toluene and octane.

Further, the toluene dispersion [4A] and the octane dispersion [4B] were allowed to stand for 300 hours, whereafter the particle diameters of the black particles were measured again. As a result, it was found that the black particles in the toluene dispersion [4A] had an average particle diameter of 165 nm and a CV value of 13% which are the same as measured before the 300 hours of standing, indicating that the particles have a high dispersion stability. The black particles in the octane dispersion [4B] had an average particle diameter of 170 nm and a CV value of 12% which are the same as measured before the 300 hours of standing, indicating that the particles have a high dispersion stability.

From these results, it is apparent that both of the toluene dispersion [4A] and the octane dispersion [4B] can be advantageously used as an ink for an electrowetting element.

Example 6

Following the same procedure as in Example 5, a 1% by mass ethanol dispersion of black particles [2'] was obtained.

200 g of the 1% by mass ethanol dispersion of the black particles [2'] was weighed into a 1,000-mL separable flask, followed by attachment of a separable cover and a stirring blade, and stirring in a nitrogen atmosphere. Then, to the flask were added 200 g of toluene, 1 g of 2-ethylhexyl acrylate (manufactured by Tokyo Chemical Industry Co., Ltd.) and 1 g of 2-(perfluorobutyl) ethyl methacrylate (manufactured by UNIMATEC CO., LTD.), followed by heating. When the temperature of the resultant mixture reached 70° C., a solution obtained by dissolving 0.02 g of ammonium persulfate in 1 g of a distilled water was added to the mixture, and the resultant was maintained at 70° C. for 3 hours to perform a polymerization, thereby obtaining black particles [2'-2] having hydrophobized surfaces.

With respect to the obtained black particles [2'-2] in ethanol/toluene, the particle diameters were measured by the same dynamic light scattering particle diameter distribution analyzer as mentioned above. As a result, the average particle diameter of the black particles [2'-2] was found to be 158 nm, and the CV value was found to be 13%.

Then, the black particles [2'-2] were subjected to an ultrasonic dispersion three times using a centrifugation and toluene, thereby obtaining a toluene dispersion (ink for an electrowetting element) [5A] of the black particles [2'-2] having hydrophobized surfaces. Further, following the same procedure as mentioned above except that toluene was replaced by octane, an octane dispersion (ink for an electrowetting element) [5B] of the black particles [2'-2] having hydrophobized surfaces was obtained.

With respect to each of the toluene dispersion [5A] and the octane dispersion [5B], the particle diameters of the black particles [2'-2] were measured by the same dynamic light scattering particle diameter distribution analyzer as mentioned above. As a result, it was found that the black particles [2'-2] in the toluene dispersion [5A] had an average particle diameter of 160 nm and a CV value of 14%, whereas the black particles [2'-2] in the octane dispersion [5B] had an average particle diameter of 168 nm and a CV value of 13%.

Thus, it is apparent that the black particles [2'-2] disperse well both in toluene and octane.

Further, the toluene dispersion [5A] and the octane dispersion [5B] were allowed to stand for 300 hours, whereafter the particle diameters of the black particles were measured again. As a result, it was found that the black particles in the toluene dispersion [5A] had an average particle diameter of 160 nm and a CV value of 14% which are the same as measured before the 300 hours of standing, indicating that the particles have a high dispersion stability. The black particles in the octane dispersion [5B] had an average particle diameter of 170 nm and a CV value of 13% which are almost the same as measured before the 300 hours of standing, indicating that the particles have a high dispersion stability.

From these results, it is apparent that both of the toluene dispersion [5A] and the octane dispersion [5B] can be advantageously used as an ink for an electrowetting element.

Comparative Example 5

Following the same procedure as in Example 2, a 1% by mass ethanol dispersion of black particles [1] was obtained.

Then, the black particles [1] were subjected to an ultrasonic dispersion twice using a centrifugation and toluene, thereby obtaining a toluene dispersion of the black particles having non-hydrophobized surfaces.

Further, following the same procedure as mentioned above except that toluene was replaced by octane, an octane dispersion of the black particles having non-hydrophobized surfaces was obtained.

With respect to each of the obtained two types of dispersions as an ink for an electrowetting element, the average particle diameters and the CV values before and after the 300 hours of standing were measured and evaluated in the same manner as in Example 2. The results are shown in Table 2.

Comparative Example 6

Following the same procedure as in Example 3, a dispersion of black particles [2] having a polystyrene core and a polypyrrole shell was obtained.

Then, the dispersion of black particles [2] was subjected to an ultrasonic dispersion twice using a centrifugation and an ethanol solution, thereby obtaining a 1% by mass ethanol dispersion (L) of the black particles [2].

Next, the dispersion was subjected to an ultrasonic dispersion twice using a centrifugation and toluene, thereby obtaining a toluene dispersion of the black particles having non-hydrophobized surfaces.

Further, following the same procedure as mentioned above except that toluene was replaced by octane, an octane dispersion of the black particles having non-hydrophobized surfaces was obtained.

With respect to each of the obtained two types of dispersions as an ink for an electrowetting element, the average particle diameters and the CV values before and after the 300 hours of standing were measured and evaluated in the same manner as in Example 2. The results are shown in Table 2.

TABLE 2

| | Black particles | | Average particle diameter and CV (immediately after dispersion (before standing)) | | Average particle diameter and CV (after 300 hr of standing) | |
|---|---|---|---|---|---|---|
| | Structure of particles | Hydrophobization | | | | |
| Ex. 2 | Polypyrrole | Method (2)-Dodecyltriethoxysilane | (1) | 110 nm (12%) | (1) | |
| | | | (2) | 120 nm (12%) | (2) | 121 nm (12%) |
| | | | (3) | 122 nm (11%) | (3) | 138 nm (15%) |
| Ex. 3 | Polystyrene (core) Polypyrrole (Shell) | Method (2)-Dodecyltriethoxysilane | (1) | 150 nm (12%) | (1) | |
| | | | (2) | 155 nm (13%) | (2) | 155 nm (13%) |
| | | | (3) | 157 nm (12%) | (3) | 178 nm (15%) |
| Ex. 4 | Polystyrene (core) Polypyrrole (Shell) | Method (2)-nonafluorohexyl-Trimethoxysilane | (1) | 150 nm (12%) | (1) | |
| | | | (2) | 154 nm (12%) | (2) | 155 nm (12%) |
| | | | (3) | 155 nm (12%) | (3) | 155 nm (12%) |
| Ex. 5 | Polystyrene (core) Polypyrrole (Shell) | Method (2)-Dodecyl acrylate | (4) | 160 nm (13%) | (4) | |
| | | | (2) | 165 nm (13%) | (2) | 165 nm (13%) |
| | | | (3) | 170 nm (12%) | (3) | 170 nm (12%) |
| Ex. 6 | Polystyrene (core) Polypyrrole (Shell) | Method (2)-2-ethylhexyl acrylate-2-(perfluorobutyl) ethyl methacrylate | (4) | 158 nm (13%) | (4) | |
| | | | (2) | 160 nm (14%) | (2) | 160 nm (14%) |

TABLE 2-continued

|  | Black particles | | Average particle diameter and CV (immediately after dispersion (before standing)) | | Average particle diameter and CV (after 300 hr of standing) | |
| --- | --- | --- | --- | --- | --- | --- |
|  | Structure of particles | Hydrophobization | | | | |
|  |  |  | (3) | 168 nm (13%) | (3) | 170 nm (13%) |
| Comp. Ex. 5 | Polypyrrole | — | (1) | 110 nm (12%) | (1) | — |
|  |  |  | (2) | 632 nm (60%) | (2) | Not available (all particles precipitated) |
|  |  |  | (3) | 650 nm (61%) | (3) | Not available (all particles precipitated) |
| Comp. Ex. 6 | Polystyrene (core) | — | (1) | 150 nm (12%) | (1) | — |
|  | Polypyrrole (Shell) |  | (2) | 650 nm (61%) | (2) | Not available (all particles precipitated) |
|  |  |  | (3) | 660 nm (63%) | (3) | Not available (all particles precipitated) |

In the Table,
(1) indicates measurement in ethanol,
(2) indicates measurement in toluene,
(3) indicates measurement in octane, and
(4) indicates measurement in ethanol/toluene.

As can be seen from Table 2, in each of the Examples, the obtained ink for an electrowetting element maintained an excellent dispersion (monodispersion) of the black particles from immediately after the production through to 300 hours after the production, and can be advantageously used as an ink for an electrowetting element whether the solvent is toluene or octane. By contrast, regarding the ink obtained in each of the Comparative Examples, the average particles diameter and the CV value of the black particles were very large even immediately after the production whether the particles were dispersed in toluene or octane, and the aggregation of the particles occurred markedly, indicating a poor dispersion stability. After 300 hours of standing, the ink obtained in each of the Comparative Examples suffered a precipitation of black particles such that the measurement of the particle diameters was impossible. This suggests that, when the dispersions of the black particles obtained in the Comparative Examples are used as an ink for an electrowetting element, disadvantages such as non-uniform image and lowering of contrast are likely to occur.

Example 7

Colorant particles having a mono-layer structure formed of PEDOT were produced as follows.

Into a 1,000-mL separable flask equipped with a four-necked separable cover, a stirring blade, a three-way cock, a condenser and a temperature probe were weighed 5 g of 3,4-ethylenedioxythiophene (manufactured by Tokyo Chemical Industry Co., Ltd.), 5 g of a polyvinylpyrrolidone (K30 manufactured by Wako Pure Chemical Industries, Ltd.) as a dispersion stabilizer and 400 g of a distilled water, followed by stirring at 100 rpm and room temperature in a nitrogen atmosphere.

To the resultant mixture was dropwise added over 5 hours a solution obtained by dissolving 13.5 g of ammonium persulfate (manufactured by Wako Pure Chemical Industries, Ltd.) as a polymerization initiator in 100 g of a distilled water. After completion of dropwise addition, the resultant mixture was stirred for 8 hours to perform a polymerization.

The resultant aqueous dispersion of resin microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, an ethanol dispersion [6A] of PEDOT particles [6] was obtained. With respect to the obtained dispersion [6A], the particle diameters of the PEDOT particles [6] were measured by a dynamic light scattering particle diameter distribution analyzer (NICOMP 380ZLS manufactured by PSS•NICOMP PARTICLE SIZING SYSTEMS). As a result, the average particle diameter of the PEDOT particles [6] was found to be 30 nm.

Then, into a 500-mL separable flask was charged 200 g of the obtained ethanol dispersion [6A] of PEDOT particles [6] with its particle concentration adjusted to 1% by mass, followed by addition of a 1% toluene solution of a poly(dodecyl methacrylate) while stirring, and removing ethanol, thereby causing the poly(dodecyl methacrylate) to be adsorbed on the surfaces of the PEDOT particles [6]. The resultant is subjected to a centrifugation and a solvent substitution, to thereby obtain an undecane dispersion [6B] of colorant particles [6-1]. The poly(dodecyl methacrylate) used (manufactured by the applicant company) had a mass average molecular weight of 84,000.

The particle concentration of the undecane dispersion of the PEDOT particles was adjusted to 20% by mass, to thereby obtain a black ink [6C] as an ink for an EW element.

Example 8

Colorant particles having a mono-layer structure formed of a polypyrrole were produced as follows.

Into a 1,000-mL separable flask equipped with a four-necked separable cover, a stirring blade, a three-way cock, a condenser and a temperature probe were weighed 4 g of pyrrole (manufactured by Wako Pure Chemical Industries, Ltd.), 5 g of a polyvinylpyrrolidone (K30 manufactured by Wako Pure Chemical Industries, Ltd.) as a dispersion stabilizer and 400 g of a distilled water, followed by stirring at room temperature and at 100 rpm in a nitrogen atmosphere.

To the resultant mixture was dropwise added over 5 hours a solution obtained by dissolving 7.0 g of ammonium persulfate (manufactured by Wako Pure Chemical Industries, Ltd.)

as a polymerization initiator in 100 g of a distilled water. After completion of dropwise addition, the resultant mixture was stirred for 8 hours to perform a polymerization.

The resultant aqueous dispersion of resin microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, an ethanol dispersion [7A] of polypyrrole particles [7] was obtained. With respect to the obtained dispersion [7A], the particle diameters of the polypyrrole particles [7] were measured by the same dynamic light scattering particle diameter distribution analyzer as mentioned above. As a result, the average particle diameter of the polypyrrole particles [7] was found to be 60 nm.

200 g of the obtained 1% by mass ethanol dispersion [7A] of polypyrrole particles [7] was weighed into a 500-mL separable flask, followed by addition of 0.2 g of 3-methacryloxypropyltrimethoxysilane. The resultant mixture was stirred for 12 hours to thereby obtain polypyrrole particles having a polymerizable functional group introduced to the surfaces thereof. Then, the resultant was subjected to an ultrasonic dispersion twice using a centrifugation and a 1% by mass aqueous solution of ammonium lauryl sulfate and ethanol, thereby obtaining a 1% by mass ethanol dispersion [7B] of the polypyrrole particles [7-1] having a polymerizable functional group introduced to the surfaces thereof.

Then, 200 g of the obtained ethanol dispersion [7B] with its particle concentration adjusted to 1% by mass was weighed into a 1,000-mL separable flask, followed by attachment of a separable cover and a stirring blade, and stirring in a nitrogen atmosphere. Then, 200 g of toluene and 5 g of dodecyl methacrylate (manufactured by Tokyo Chemical Industry Co., Ltd.) were added to the flask, followed by heating. When the temperature of the resultant mixture reached 70° C., a solution obtained by dissolving 0.2 g of ammonium persulfate in 1 g of ethanol was added to the mixture, and the resultant was maintained at 70° C. for 3 hours to perform a polymerization, thereby hydrophobizing the surfaces of the particles. The resultant is subjected to a centrifugation and a solvent substitution, to thereby obtain an undecane dispersion [7C] of polypyrrole particles [7-1] having hydrophobized surfaces.

The particle concentration of the undecane dispersion of the polypyrrole particles was adjusted to 20% by mass, to thereby obtain a black ink [7D] as an ink for an EW element.

Example 9

Colorant particles having a mono-layer structure formed of a polypyrrole were produced as follows.
An ethanol dispersion [8A] of polypyrrole particles [8] was produced in the same manner as in Example 8 except that the amount of the ammonium persulfate used for production of the polypyrrole particles was changed to 10.0 g. With respect to the obtained dispersion [8A], the particle diameters of the polypyrrole particles [8] were measured by the same dynamic light scattering particle diameter distribution analyzer as mentioned above. As a result, the average particle diameter of the polypyrrole particles [8] was found to be 80 nm.

Following the same procedure as in Example 8, an undecane dispersion [8B] of polypyrrole particles [8] was obtained. Further, the particle concentration of the undecane dispersion [8B] of the polypyrrole particles [8] was adjusted to 20% by mass, to thereby obtain a black ink [8C] as an ink for an EW element.

Example 10

Colorant particles having a core-shell structure in which the core is formed of a polystyrene and the shell is formed of a polypyrrole were produced as follows.

Into a 1,000-mL separable flask equipped with a four-necked separable cover, a stirring blade, a three-way cock, a condenser and a temperature probe were weighed 40 g of styrene (manufactured by Wako Pure Chemical Industries, Ltd.), 0.4 g of sodium parastyrene sulfonate (manufactured by Wako Pure Chemical Industries, Ltd.), 0.3 g of potassium persulfate (manufactured by Wako Pure Chemical Industries, Ltd.) as a polymerization initiator and 500 g of a distilled water, followed by stirring at 200 rpm, to thereby perform a polymerization in a nitrogen atmosphere at 70° C. for 12 hours.

The resultant aqueous dispersion of resin microparticles was subjected to an ultrasonic dispersion twice using a centrifugation and a distilled water, to thereby perform a removal/wash away of unreacted monomers, initiator and the like. As a result, a dispersion [9A] of polystyrene particles for forming cores was obtained.

With respect to the polystyrene particles in the obtained dispersion [9A], the particle diameters were measured by the same dynamic light scattering particle diameter distribution analyzer as mentioned above. As a result, the average particle diameter of the polystyrene particles was found to be 80 nm.

Then, into a 500-mL separable flask were weighed 100 g of a 1% by mass dilution of the dispersion [9B] of polystyrene particles, 20 g of a 5% by mass aqueous solution of a polyvinylpyrrolidone (K30 manufactured by Wako Pure Chemical Industries, Ltd.), followed by attachment of a separable cover and a stirring blade, and stirring at 100 rpm.

Then, 2 g of pyrrole (manufactured by Wako Pure Chemical Industries, Ltd.) was added to the flask and the temperature was elevated to 60° C. To the resultant mixture was dropwise added over 5 hours a solution obtained by dissolving 6.8 g of ammonium persulfate (manufactured by Wako Pure Chemical Industries, Ltd.) as a polymerization initiator in 100 g of an ion exchanged water. After completion of the dropwise addition, the mixture was further stirred for 8 hours while heating, followed by cooling to terminate the reaction, thereby obtaining a dispersion containing black-colored colorant particles [9] having a polystyrene core and a polypyrrole shell.

The resultant aqueous dispersion of colorant microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, a dispersion [9C] of black-colored colorant particles having a polystyrene core and a polypyrrole shell was obtained. With respect to the colorant particles in the obtained dispersion [9C], the particle diameters were measured by the same dynamic light scattering particle diameter distribution analyzer as mentioned above, and the average particle diameter was found to be 120 nm.

200 g of the obtained 1% by mass ethanol dispersion [9C] of black-colored colorant particles having a polystyrene core and a polypyrrole shell was weighed into a 500-mL separable flask, followed by addition of 0.2 g of 3-methacryloxypropyltrimethoxysilane. The resultant mixture was stirred for 12 hours to thereby obtain black-colored colorant particles having a polymerizable functional group introduced to the surfaces thereof. Then, the resultant was subjected to an ultrasonic dispersion twice using a centrifugation and a 1% by mass aqueous solution of ammonium lauryl sulfate and ethanol, thereby obtaining a 1% by mass ethanol dispersion [9D] of the black-colored colorant particles having a polymerizable functional group introduced to the surfaces thereof.

Then, 200 g of the obtained ethanol dispersion [9D] with its particle concentration adjusted to 1% by mass was weighed into a 1,000-mL separable flask, followed by attachment of a separable cover and a stirring blade, and stirring in a nitrogen atmosphere. Then, 200 g of toluene and 5 g of dodecyl methacrylate (manufactured by Tokyo Chemical Industry Co., Ltd.) were added to the flask, followed by heating. When the temperature of the resultant mixture reached 70° C., a solution obtained by dissolving 0.2 g of ammonium persulfate in 1 g of ethanol was added to the mixture, and the resultant was maintained at 70° C. for 3 hours to perform a polymerization, thereby hydrophobizing the surfaces of the particles. The resultant is subjected to a centrifugation and a solvent substitution, to thereby obtain an undecane dispersion [9E] of black-colored colorant particles [9-1] having a polystyrene core and a polypyrrole shell.

The particle concentration of the undecane dispersion of the black-colored colorant particles [9-1] having a polystyrene core and a polypyrrole shell was adjusted to 20% by mass, to thereby obtain a black ink [9F] as an ink for an EW element.

Example 11

Black particles in the form of composite particles composed of carbon black and a polystyrene were produced as follows.

10 g of carbon black and 3 g of sodium dodecyl sulfate were added to 110 g of water, and the resultant mixture was subjected to an ultrasonic irradiation for 15 minutes, to thereby obtain a pigment dispersion [10A].

Into a 500-mL separable flask equipped with a four-necked separable cover, a stirring blade, a three-way cock, a condenser and a temperature probe were weighed a solution of 2 g of a styrene oligomer (manufactured by the applicant company) in 20 g of a polystyrene (manufactured by Wako Pure Chemical Industries, Ltd.), 2 g of divinylbenzene (manufactured by Tokyo Chemical Industry Co., Ltd.), 1 g of 2,2'-azobis(2-methylbutyronitrile) (manufactured by Wako Pure Chemical Industries, Ltd.) and 150 g of a distilled water. The resultant mixture was subjected to an ultrasonic irradiation for 3 minutes to emulsify the mixture, to thereby obtain a monomer emulsion. Then, the pigment dispersion was blended into the monomer emulsion, followed by emulsification carried out by ultrasonic irradiation for 5 minutes and polymerization carried out in a nitrogen atmosphere at 70° C. for 8 hours, to thereby obtain carbon black/polystyrene composite particles.

The obtained carbon black/polystyrene composite particles were subjected to an ultrasonic dispersion once using a centrifugation and a distilled water and, then, further subjected to an ultrasonic dispersion once using a centrifugation and a 1% by mass aqueous solution of ammonium lauryl sulfate and ethanol, thereby obtaining an ethanol dispersion [10B] of the carbon black/polystyrene composite particles [10]. With respect to the obtained dispersion [10B], the particle diameters of the composite particles [10] were measured by the same dynamic light scattering particle diameter distribution analyzer as mentioned above. As a result, the average particle diameter of the composite particles [10] was found to be 280 nm.

Following the same procedure as in Example 8, an undecane dispersion [10C] of the carbon black/polystyrene composite particles was obtained. The particle concentration of the undecane dispersion of the carbon black/polystyrene composite particles was adjusted to 20% by mass, to thereby obtain a black ink [10C] as an ink for an EW element.

Example 12

With respect to the undecane dispersion of the colorant particles [7-2] obtained in Example 8, the concentration of the colorant particles [7-2] in undecane was adjusted to 45% by mass to thereby obtain a black ink [11A] as an ink for an EW element.

Example 13

Black-colored colorant particles having a polystyrene core and a polypyrrole shell were produced and the surfaces thereof were hydrophobized in the same manner as in Example 10 except that the dodecyl methacrylate used for the hydrophobization was replaced by octyl methacrylate (manufactured by Tokyo Chemical Industry Co., Ltd.). The resultant is subjected to a centrifugation and a solvent substitution, to thereby obtain an undecane dispersion [12A] of black-colored colorant particles having a polystyrene core and a polypyrrole shell. The particle concentration of the undecane dispersion [12A] was adjusted to 20% by mass, to thereby obtain a black ink [12B] as an ink for an EW element.

Comparative Example 7

A dispersion [13A] of polystyrene particles was produced in the same manner as in Example 10, except that the amount of styrene (manufactured by Wako Pure Chemical Industries, Ltd.) added as a monomer for forming a polystyrene core was changed to 60 g, the amount of sodium parastyrene sulfonate (manufactured by Wako Pure Chemical Industries, Ltd.) was changed to 0.2 g, and the amount of potassium persulfate (manufactured by Wako Pure Chemical Industries, Ltd.) added as a polymerization initiator was changed to 0.1 g.

With respect to the obtained dispersion [13A], the particle diameters of the polystyrene particles were measured by the same dynamic light scattering particle diameter distribution analyzer as mentioned above. As a result, the average particle diameter of the polystyrene particles was found to be 275 nm.

Using the thus obtained dispersion [13A] of polystyrene particles, the formation of a polypyrrole shell was performed in the same manner as in Example 10 except that the amount of pyrrole (manufactured by Wako Pure Chemical Industries, Ltd.) added as a monomer was changed to 10 g and the amount of ammonium persulfate (manufactured by Wako Pure Chemical Industries, Ltd.) added as a polymerization initiator was changed to 33.7 g, to thereby obtain a dispersion of black-colored colorant particles [13].

The resultant aqueous dispersion of colorant microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, an ethanol dispersion [13B] of black-colored colorant particles having a polystyrene core and a polypyrrole shell was obtained. With respect to the colorant particles in the obtained dispersion [13B], the particle diameters were measured by the same dynamic light scattering particle diameter distribution analyzer as mentioned above, and the average particle diameter was found to be 320 nm.

Following the same procedure as in Example 10, an undecane dispersion of colorant particles [13] was obtained. The particle concentration of the undecane dispersion [13] was adjusted to 20% by mass, to thereby obtain a black ink [13C] as an ink for an EW element.

Comparative Example 8

Colorant particles having a core-shell structure in which the core is formed of silica and the shell is formed of a polypyrrole were produced as follows.

Into a 500-mL separable flask equipped with a four-necked separable cover, a stirring blade, a three-way cock, a condenser and a temperature probe were weighed 150 g of ethanol (manufactured by Wako Pure Chemical Industries, Ltd.), 8 g of 28% aqueous ammonia (manufactured by Wako Pure Chemical Industries, Ltd.), 50 g of a distilled water, followed by stirring at 400 rpm. To the resultant was added 5 g of tetraethoxysilane, to thereby perform a reaction at room temperature for 12 hours.

The resultant aqueous dispersion of silica microparticles was subjected to an ultrasonic dispersion twice using a centrifugation and a distilled water, to thereby carry out washing. As a result, a dispersion [14A] of silica particles for forming cores was obtained.

With respect to the silica particles in the obtained dispersion [14A], the particle diameters were measured by the same dynamic light scattering particle diameter distribution analyzer as mentioned above. As a result, the average particle diameter of the silica particles was found to be 255 nm.

Then, into a 500-mL separable flask were weighed 100 g of a 1% by mass dilution of the dispersion [14B] of silica particles, 20 g of a 5% by mass aqueous solution of a polyvinylpyrrolidone (K30 manufactured by Wako Pure Chemical Industries, Ltd.), followed by attachment of a separable cover and a stirring blade, and stirring at 100 rpm.

Then, 4 g of pyrrole (manufactured by Wako Pure Chemical Industries, Ltd.) was added to the flask and the temperature was elevated to 60° C. To the resultant mixture was dropwise added over 5 hours a solution obtained by dissolving 13.5 g of ammonium persulfate (manufactured by Wako Pure Chemical Industries, Ltd.) as a polymerization initiator in 100 g of an ion exchanged water. After completion of the dropwise addition, the mixture was further stirred for 8 hours while heating, followed by cooling to terminate the reaction, thereby obtaining a dispersion of black-colored colorant particles [14] having a silica core and a polypyrrole shell.

The resultant aqueous dispersion of colorant microparticles was subjected to an ultrasonic dispersion once using a centrifugation and a distilled water, and, then, further subjected to an ultrasonic dispersion once using a centrifugation and ethanol, to thereby perform a removal/wash away of unreacted monomers, initiator and the like. As a result, a dispersion [14C] of black-colored colorant particles having a silica core and a polypyrrole shell was obtained. With respect to the colorant particles in the obtained dispersion [14C], the particle diameters were measured by the same dynamic light scattering particle diameter distribution analyzer as mentioned above, and the average particle diameter was found to be 280 nm.

Following the same procedure as in Example 8, an undecane dispersion [14D] of the black-colored colorant particles having a silica core and a polypyrrole shell was obtained. Further, the particle concentration of the undecane dispersion [14D] of the black-colored colorant particles having a silica core and a polypyrrole shell was adjusted to 20% by mass, to thereby obtain a black ink [14E] as an ink for an EW element.

Comparative Example 9

With respect to the undecane dispersion of the colorant particles [7-2] obtained in Example 8, the concentration of the colorant particles [7-2] in undecane was adjusted to 55% by mass to thereby obtain a black ink [15A] as an ink for an EW element.

Comparative Example 10

With respect to the undecane dispersion of the colorant particles [8] obtained in Example 9, the concentration of the colorant particles [8] in undecane was adjusted to 55% by mass to thereby obtain a black ink [16A] as an ink for an EW element.

Comparative Example 11

With respect to the undecane dispersion of the colorant particles [10] obtained in Example 11, the concentration of the colorant particles [10] in undecane was adjusted to 3% by mass to thereby obtain a black ink [17A] as an ink for an EW element.

Comparative Example 12

With respect to the undecane dispersion of the colorant particles [9-1] obtained in Example 10, the concentration of the colorant particles [9-1] in undecane was adjusted to 4% by mass to thereby obtain a black ink [18A] as an ink for an EW element.

Comparative Example 13

An acetone dispersion [19A] of black-colored colorant particles having a polystyrene core and a polypyrrole shell was produced in the same manner as in Example 10 except that the solvent substitution after the hydrophobization of the particle surfaces was carried out using acetone instead of undecane. The particle concentration of the acetone dispersion was adjusted to 4% by mass, to thereby obtain a black ink [19B] as an ink for an EW element.

Comparative Example 14

An undecane dispersion [20A] of black-colored colorant particles having a polystyrene core and a polypyrrole shell was produced in the same manner as in Example 10 except that the dodecyl methacrylate used for the hydrophobization was replaced by methyl methacrylate (manufactured by Tokyo Chemical Industry Co., Ltd.). The particle concentration of the undecane dispersion [20A] was adjusted to 4% by mass, to thereby obtain a black ink [20B] as an ink for an EW element.

The colorant particles in the obtained ink for an EW element were dried in vacuo and the specific gravity of the dried product was measured by a true specific gravity meter (Accupyc manufactured by Shimadzu Corporation). The result is shown in Table 3.

The obtained inks for an EW element were evaluated based on the following criteria. The results are shown in Table 3.

1. Evaluation of Dispersion Stability

For evaluating the dispersion stability of an ink for an EW element, firstly, 10 mL of the black ink was added to a measuring cylinder with stopper having an outer diameter of 14 mm and a capacity of 10 mL, and allowed to stand at room temperature for 1 week. Then, the ink was visually observed to check the presence or absence of supernatant. In the case where no supernatant was observed, the ink was subjected to a centrifugation at 10,000 rpm for 15 minutes and the resultant was visually observed to check the condition of a supernatant.

The dispersion stability of the ink for an EW element was evaluated based on the following criteria.

energy liquid, and the driving movement of the ink was observed through an optical microscope. The driving movement of the ink was caused by a function generator and an amplifier with the application of 20 Vpp square wave at 0.5 Hz.

The driving performance of EWD was evaluated based on the following criteria.

A: Smooth drive of the ink for an EW element could be confirmed in view of the driven movement of the ink, no occurrence of non-uniform image and showing of a good contrast.

B: Smooth drive of the ink for an EW element could not be confirmed in view of no driven movement of the ink, occurrence of non-uniform image, showing of a poor contrast, etc.

TABLE 3

| | Construction | | | Properties | | Colorant particle content (% by mass) | Evaluation | | |
|---|---|---|---|---|---|---|---|---|---|
| Example/ Comp. Example | Type of colorant particles | Surface treatment method | Dispersion medium | Particle diameter (DLS) | Specific Gravity | | Dispersion stability | OD value (hiding power) | EWD driving performance |
| Ex. 7 | PEDOT | (2-1) Poly(dodecyl methacrylate) | Undecane | 30 | 1.7 | 20 | A | B(0.9) | A |
| Ex. 8 | Ppy | (2-3) Dodecyl methacrylate | Undecane | 60 | 1.6 | 20 | A | B(0.9) | A |
| Ex. 9 | Ppy | (2-1) Poly(dodecyl methacrylate) | Undecane | 80 | 1.6 | 20 | B | A(1.1) | A |
| Ex. 10 | Ppy/Pst | (2-3) Dodecyl methacrylate | Undecane | 120 | 1.4 | 20 | B | A(1.1) | A |
| Ex. 11 | CB/Pst | (2-1) Poly(dodecyl methacrylate) | Undecane | 280 | 1.4 | 7 | B | B(0.4) | A |
| Ex. 12 | Ppy | (2-3) Dodecyl methacrylate | Undecane | 60 | 1.4 | 45 | A | A(2.3) | A |
| Ex. 13 | Ppy/Pst | (2-3) Octyl methacrylate | Undecane | 120 | 1.4 | 20 | B | A(1.1) | A |
| Comp. Ex. 7 | Ppy/Pst | (2-1) Poly(dodecyl methacrylate) | Undecane | 320 | 1.4 | 20 | — | — | B (Non-uniformity of image) |
| Comp. Ex. 8 | Ppy/Silica | (2-1) Poly(dodecyl methacrylate) | Undecane | 280 | 2.2 | 10 | C | — | B (Non-uniformity of image) |
| Comp. Ex. 9 | Ppy | (2-3) Dodecyl methacrylate | Undecane | 60 | 1.4 | 55 | C | — | B (Non-uniformity of image) |
| Comp. Ex. 10 | Ppy | (2-3) Dodecyl methacrylate | Undecane | 80 | 1.4 | 55 | C | — | B (Non-uniformity of image) |
| Comp. Ex. 11 | CB/Pst | (2-1) Poly(dodecyl methacrylate) | Undecane | 280 | 1.4 | 4 | — | C(0.18) | B (Low contrast) |
| Comp. Ex. 12 | Ppy/Pst | (2-3) Octyl methacrylate | Undecane | 120 | 1.4 | 4 | B | C(0.15) | B (Low contrast) |
| Comp. Ex. 13 | Ppy/Pst | (2-3) Octyl methacrylate | Acetone | 120 | 1.4 | 4 | — | — | B (Not driven) |
| Comp. Ex. 14 | Ppy/Pst | (2-3) Methyl methacrylate | Undecane | 120 | 1.4 | 4 | C | — | — |

A: No supernatant was observed after 1 week of standing. Even after 15 minutes of centrifugation at 10,000 rpm, the supernatant was colored.

B: No supernatant was observed after 1 week of standing. However, after 15 minutes of centrifugation at 10,000 rpm, the supernatant was transparent.

C: Supernatant was clearly observed.

2. Evaluation of Hiding Power

The ink for an EW element was diluted 2,500-fold, and the absorbance thereof was measured by an ultraviolet-visible spectrophotometer using a 1-cm quartz cell. The hiding power was evaluated in terms of the absorbance based on the following criteria.

A: 1.0 or more
B: 0.2 to less than 1.0
C: less than 0.2

3. Evaluation of Driving Performance of EWD

A test cell was produced using the ink for an EW element as the low surface energy liquid and water as the high surface As can be seen from Table 3, the black inks (inks for an EW element) obtained in the Examples exceled the inks obtained in the Comparative Examples in respect of all of the dispersion stability, the hiding power and the driving performance of EWD.

On the other hand, as can be seen from Table 3, the ink for an EW element obtained in Comparative Example 7 had too large an average particle diameter of the colorant particles so that the driving performance of EW was poor and the non-uniformity of image was observed through a microscope. The inks for an EW element obtained in Comparative Examples 8 to 10 were poor in the ink dispersibility and suffered from non-uniformity of image due to the precipitation of the colorant particles. The inks for an EW element obtained in Comparative Examples 11 and 12 had a poor hiding power so that the image contrast was poor and the confirmation of the operation was difficult. Regarding the ink for an EW element obtained in Comparative Example 13, a mixing occurred between the low surface energy liquid and the high surface energy liquid so that the EWD was not driven.

Industrial Applicability

The ink of the present invention for an EW element is advantageous in that the ink is excellent in respect of the dispersibility of the pigment contained in the ink and the hiding power.

DESCRIPTION OF THE REFERENCE SYMBOLS

10 EW element
100 EWD

The invention claimed is:

1. An ink for an electrowetting element comprising colorant particles and a solvent,
wherein the colorant particles have a specific gravity of 2 or less and an average particle diameter of 20 to 300 nm,
wherein the colorant particles are black particles, and
wherein the content of the colorant particles in the ink is 5 to 50% by mass.

2. The ink for an electrowetting element according to claim 1, wherein the average particle diameter of the colorant particles is 60 to 120 nm.

3. The ink for an electrowetting element according to claim 1, wherein the solubility parameter of the solvent is 9 or less.

4. The ink for an electrowetting element according to claim 1, wherein the colorant particles have hydrophobized surfaces.

5. The ink for an electrowetting element according to claim 1, wherein the colorant particles comprise a π-conjugated compound.

6. An electrowetting device using the ink for an electrowetting device according to claim 1.

7. An electrowetting device comprising a high energy liquid as a first liquid material and a low energy liquid as a second liquid material which are immiscible with each other, the second liquid material being the ink for an electrowetting element according to claim 1, wherein the first liquid material and the second liquid material are accommodated in a cell formed between a first substrate and a second substrate which are positioned opposite to each other.

8. The electrowetting device according to claim 7, wherein the solubility parameter of the high energy liquid is 14 or more, and the solubility parameter of the low energy liquid is 9 or less.

* * * * *